United States Patent
Nakamura et al.

(10) Patent No.: US 6,954,263 B2
(45) Date of Patent: Oct. 11, 2005

(54) OPTICAL CHARACTERISTIC MEASURING APPARATUS, METHOD AND RECORDING MEDIUM

(75) Inventors: Kenichi Nakamura, Tokyo (JP); Eiji Kimura, Tokyo (JP); Takahisa Tomi, Tokyo (JP)

(73) Assignee: Advantest Corporation, Tokyo (JP)

( * ) Notice: Subject to any disclaimer, the term of this patent is extended or adjusted under 35 U.S.C. 154(b) by 173 days.

(21) Appl. No.: 10/297,204

(22) PCT Filed: Jun. 1, 2001

(86) PCT No.: PCT/JP01/04666

§ 371 (c)(1),
(2), (4) Date: May 22, 2003

(87) PCT Pub. No.: WO01/94906

PCT Pub. Date: Dec. 13, 2001

(65) Prior Publication Data

US 2004/0105089 A1 Jun. 3, 2004

(30) Foreign Application Priority Data

Jun. 6, 2000 (JP) ........................ 2000-169027

(51) Int. Cl.$^7$ ............................................. G01N 21/00
(52) U.S. Cl. ..................................................... 356/73.1
(58) Field of Search ..................... 356/73.1; 385/24–27, 385/39–46, 147, 123, 122; 250/227.18, 227.23, 551

(56) References Cited

U.S. PATENT DOCUMENTS 5,991,477 A * 11/1999 Ishikawa et al. ............... 385/24
6,154,273 A * 11/2000 Suzuki ....................... 356/73.1
6,594,003 B1 * 7/2003 Horiuchi et al. ............ 356/73.1

FOREIGN PATENT DOCUMENTS

| DE | 19724676 | | 1/1999 |
| EP | 0280328 | A | 8/1988 |
| JP | 6-34447 | A | 2/1994 |
| JP | 9-264814 | A | 10/1997 |

* cited by examiner

Primary Examiner—Tu T. Nguyen
(74) Attorney, Agent, or Firm—Lowe Hauptman & Berner, LLP

(57) ABSTRACT

Disclosed is an apparatus for enlarging the range of modulation frequencies that modulate the variable wavelength light generated by the light source without prejudice to the measurement of optical characteristics. A modified modulation frequency computing section computes modified modulation frequencies by multiplying by the initial modulation frequency fmin by the value obtained by dividing the given phase value by the phase difference between the first phase of the transmitted light resulting from the transmission through the DUT of the incident light of the first wavelength modulated by the initial modulation frequency fmin and the second phase of the transmitted light resulting from the transmission through the DUT of the incident light of the second wavelength modulated by the initial modulation frequency fmin. A modified modulation frequency setting section sets the modified modulation frequency as the frequency of the modulating signal so that the frequencies for modulating the incident light may be wider in range than the initial modulation frequency fmin and that the phase difference may be kept at a value equal to or below the given phase value, and the precision of measuring phase differences can be enhanced.

13 Claims, 13 Drawing Sheets

(a)

(b)

(c) $\Delta \phi_i = \dfrac{f_i}{f_{min}} \times \Delta \phi_{min\_i}$ (d) $f_i = \dfrac{\pi \cdot f_{min}}{\phi_{min}}$ (e) $f_i = \dfrac{(\text{Given value}) \cdot f_{min}}{\Delta \phi_{min}}$

US 6,954,263 B2

OPTICAL CHARACTERISTIC MEASURING APPARATUS, METHOD AND RECORDING MEDIUM

TECHNICAL FIELD

The present invention relates to the measurement of the dispersion characteristic of optical fibers and other optical devices, and in particular to the determination of the frequency of modulating the incident light to optical devices.

BACKGROUND ART

FIG. 12 is a block diagram showing the configuration of an optical characteristic measuring apparatus according to the prior art. As shown in FIG. 12, the measuring system is divided into a light source system 10 and a characteristic measurement system 20. A variable wavelength light source 12 of the light source system 10 varies the wavelength to generate a light (variable wavelength light) having wavelengths of $\lambda i$ and $\lambda i+1$. The variable wavelength light will be modulated by a light modulator 14. The light modulator 14 includes LN (lithium niobate). The light modulator 14 receives an electrical signal having a frequency of fi from a modulation power supply 16 and modulates the variable wavelength light with the frequency fi.

The light outputted from the light modulator 14 is introduced into an optical fiber or other DUT (device under test) 30. The transmitted light having transmitted the DUT 30 will be supplied to an optical/electrical converter 22 of the characteristic measuring system 20. The optical/electrical converter 22 proceeds to an optical/electrical conversion of the transmitted light and outputs to a phase comparator 24. The phase comparator 24 measures the phase of the output signal of the optical/electrical converter 22 with reference to the electrical signal produced by the modulation power supply 16. Here, the phase when the incident light wavelength is $\lambda i$ will be represented by $\phi i$ and the phase when the incident light wavelength is $\lambda i+1$ will be represented by $\phi i+1$. The characteristic computing section 26 will compute the wavelength dispersion characteristic and other characteristics of the DUT 30 from $\phi i$ and $\phi i+1$.

The operation of the characteristic computing section 26 will be described with reference to the phase-wavelength diagram shown in FIG. 13. When $\phi i+1-\phi i$ is represented by $\Delta\phi$, the group delay time is computed from $\Delta\phi$ and the modulation frequency fi, and then the wavelength dispersion is computed therefrom.

Here, the range of phase difference that can be measured from the phase comparator 24 extends from $-\pi$ to $\pi$. Therefore, it is preferable that $\phi i+1-\phi i$ would be within the range extending from $-\pi$ to $\pi$. This is because any large modulation frequency fi can easily exceed the range of $-\pi$ to $\pi$. In other words, when the same time difference is expressed by the phase difference, the bigger the frequency is, the cycle is shorter, and when it is expressed by the phase difference, the cycle will be longer. For example, when the time difference is $\frac{1}{50}$ secs., if the frequency is 1 Hz, the range of phase difference is only $0.04\pi$, but if the frequency is 50 Hz, it will be $2\pi$. Therefore, the modulation frequency fi should be lowered to the minimum possible, and the wavelength $\lambda$ of the incident light should be varied.

However, in order to measure $\Delta\phi$ with a high precision, it is preferable that the modulation frequency fi has a high value. This is due to the fact that, when a same time difference is expressed with a phase difference, the larger the frequency is, the shorter the cycle becomes, and when it is expressed with a phased difference, the cycle will be greater.

Therefore, the present invention has an object of providing devices enabling to enlarge the modulation frequency that modulates a variable length wavelength generated by the light source without making problem with respect to the measurement of the optical characteristic.

DISCLOSURE OF INVENTION

According to the present invention an apparatus for measuring the characteristics of device under test that transmits light includes: a variable wavelength light source for generating a variable wavelength light; a wavelength setting unit for setting the variable wavelength light at a first wavelength and a second wavelength; an initial modulation frequency setting unit for setting the initial modulation frequency for modulation; a modulating signal generating unit for generating a modulating signal of a set modulation frequency; an optical modulating unit for receiving the input of the modulating signal and modulating the variable wavelength light with the frequency of the modulating signal; a phase measuring unit for measuring a first phase of a transmitted light, which is obtained by the transmission through the device under test of an incident light having the first wavelength and a second phase of the transmitted light, which is obtained by the transmission through the device under test of an incident light having the second wavelength; a modified modulation frequency computing unit for computing a modified modulation frequency by multiplying the value, which is obtained by dividing the given phase value by the phase difference between the first phase and the second phase, by the initial modulation frequency; and a modified modulation frequency setting unit for setting the modified modulation frequency as the frequency of the modulating signal, wherein the characteristics of device under test are measured on the basis of the transmitted light resulting from the transmission through the device under test of the incident light modulated by a frequency set by the modified modulation frequency setting unit.

The initial modulation frequency is limited to a small value to insure that the phase difference between the first phase and the second phase will be less than the given phase value, for example, $\pi$. However, the modified modulation frequency computing unit enables to compute a modified modulation frequency that causes the phase difference between the transmitted light corresponding to the first wavelength and the transmitted light corresponding to the second wavelength to coincide with the given phase value. Therefore, if the frequency modulating the incident light is chosen as the modified modulation frequency by the modified modulation frequency setting unit, the phase difference between the transmitted light corresponding to the first wavelength and the transmitted light corresponding to the second wavelength will be the given phase value. Therefore, it is possible to measure the phase difference. And further as the frequency for modulating the incident light can be increased, the measurement precision of the phase difference can be improved.

The present invention is the optical characteristic measuring apparatus, wherein the initial modulation frequency setting unit sets the minimum initial modulation frequency an the initial modulation frequencies other than the minimum initial modulation frequency; the modified modulation frequency computing unit computes a modified modulation frequency by multiplying by the minimum initial modulation frequency the value obtained by dividing the given phase value by the phase difference between the first phase and the second phase of the transmitted light resulting from the transmission through the device under test of the incident light modulated by the minimum initial modulation frequency; and the modified modulation frequency setting unit sets the maximum the initial modulation frequency among the initial modulation frequencies equal to or below the modified modulation frequencies as the frequency of the modulating signal.

The initial modulation frequency is limited to a small value to insure that the phase difference between the first phase and the second phase will be less than the given phase value, for example, π. However, the modified modulation frequency computing unit enables to compute a modified modulation frequency that causes the phase difference between the transmitted light corresponding to the first wavelength and the transmitted light corresponding to the second wavelength to coincide with the given phase value. Therefore, if the maximum initial modulation frequency among the initial modulation frequencies below the modified modulation frequency is set as the modified modulation frequency by the modified modulation frequency setting unit, the phase difference between the transmitted light corresponding to the first wavelength and the transmitted light corresponding to the second wavelength will be the given phase value. Therefore, it is possible to measure the phase difference. And further as the frequency for modulating the incident light can be increased, the measurement precision of the phase difference can be improved.

The present invention is the optical characteristic measuring apparatus, wherein there are a plurality of first wavelengths and a plurality of second wavelengths.

The present invention is the optical characteristic measuring apparatus wherein the intervals between the first wavelength and the second wavelength are equal, and the second wavelength is taken as the first wavelength and further another second wavelength is taken so that the intervals between the first wavelength and the second wavelength are equal.

The present invention is the optical characteristics measuring apparatus, wherein after completing the setting of the first wavelength and the second wavelength, the modified modulation frequency setting unit sets the modified modulation frequency as the frequency of the modulating signal.

The present invention is the optical characteristics measuring apparatus, wherein every time when the first wavelength and the second wavelength are set, the modified modulation frequency setting unit sets the modified modulation frequency as the frequency of the modulating signal.

According to the present invention, the optical characteristics measuring apparatus includes an optical/electrical conversion unit for outputting electrical signals obtained by optical/electrical conversion of the transmitted light to the phase measuring unit.

The present invention is the optical characteristics measuring apparatus, wherein the phase measuring unit measures the phase difference between the modulating signal and the transmitted light.

According to the present invention, the optical characteristics measuring apparatus includes a characteristic computing unit for computing the group delay or the wavelength dispersion of the device under test by unit of the phase difference measured by the phase measuring unit.

According to the present invention, a method for measuring the characteristics of device under test that transmits light includes: a variable wavelength light generating step for generating a variable wavelength light; a wavelength setting step for setting the variable wavelength light at a first wavelength and a second wavelength; an initial modulation frequency setting step for setting the initial modulation frequency for modulation; a modulating signal generating step for generating a modulating signal of a set modulation frequency; an optical modulating step for receiving the input of the modulating signal and modulating the variable wavelength light with the frequency of the modulating signal; a phase measuring step for measuring the first phase of the transmitted light, which is obtained by the transmission through the device under test of an incident light having the first wavelength and the second phase of the transmitted light, which is obtained by the transmission through the device under test of an incident light having the second wavelength; a modified modulation frequency computing step for computing a modified modulation frequency by multiplying the value, which is obtained by dividing the given phase value by the phase difference between the first phase and the second phase, by the initial modulation frequency; and a modified modulation frequency setting step for setting the modified modulation frequency as the frequency of the modulating signal, wherein the characteristics of device under test are measure on the basis of the transmitted light resulting from the transmission through the device under test of the incident light modulated by a frequency set by the modified modulation frequency setting step.

The present invention is the optical characteristic measuring method, wherein the initial modulation frequency setting step sets the minimum initial modulation frequency and the initial modulation frequencies other than the minimum initial modulation frequency; the modified modulation frequency computing step computes a modified modulation frequency by multiplying by the minimum initial modulation frequency the value obtained by dividing the given phase value by the phase difference between the first phase and the second phase of the transmitted light resulting from the transmission through the device under test of the incident light modulated by the minimum initial modulation frequency; and the modified modulation frequency setting step sets the maximum initial modulation frequency among the initial modulation frequencies equal to or below the modified modulation frequencies as the frequency of the modulating signal.

The present invention is a computer-readable medium having a program of instructions for execution by the computer to perform a characteristic measuring process for measuring characteristics of device under test that transmits light, the characteristics measuring process including: a variable wavelength light generating process for generating a variable wavelength light; a wavelength setting process for setting the variable wavelength light at a first wavelength and a second wavelength; an initial modulation frequency setting process for setting the initial modulation frequency for modulation; a modulating signal generating process for generating a modulating signal of a set modulation frequency; an optical modulating process for receiving the input of the modulating signal and modulating the variable wavelength light with the frequency of the modulating signal; a phase measuring process for measuring the first phase of the transmitted light, which is obtained by the transmission through the device under test of an incident light having the first wavelength and the second phase of the transmitted light, which is obtained by the transmission through the device under test of an incident light having the second wavelength; a modified modulation frequency computing process for computing a modified modulation frequency by multiplying the value, which is obtained by dividing the given phase value by the phase difference between the first phase and the second phase, by the initial modulation frequency; and a modified modulation frequency setting process for setting the modified modulation frequency as the frequency of the modulating signal, wherein the characteristics of device under test are measured on the basis of the transmitted light resulting from the transmission through the device under test of the incident light modulated by a frequency set by the modified modulation frequency process.

The present invention is the computer-readable medium, wherein the initial modulation frequency setting process sets the minimum initial modulation frequency and the initial modulation frequencies other than the minimum initial modulation frequency; the modified modulation frequency computing process computes a modified modulation frequency by multiplying the minimum initial modulation frequency the value obtained by dividing the given phase value by the phase difference between the first phase and the second phase of the transmitted light resulting from the transmission through the device under test of the incident light modulated by the minimum initial modulation frequency; and the modified modulation frequency setting process sets the maximum the initial modulation frequency among the initial modulation frequencies equal to or below the modified modulation frequencies as the frequency of the modulating signal.

BRIEF DESCRIPTION OF THE DRAWINGS

The present invention is illustrated by way of example, and not limitation, in the figures of the accompanying drawings, wherein elements having the same reference numeral designations represent like elements throughout and wherein.

BEST MODE FOR CARRYING OUT THE INVENTION

The preferred embodiments of the present invention are described with reference to drawings.

The First Preferred Embodiment

Figure 1:
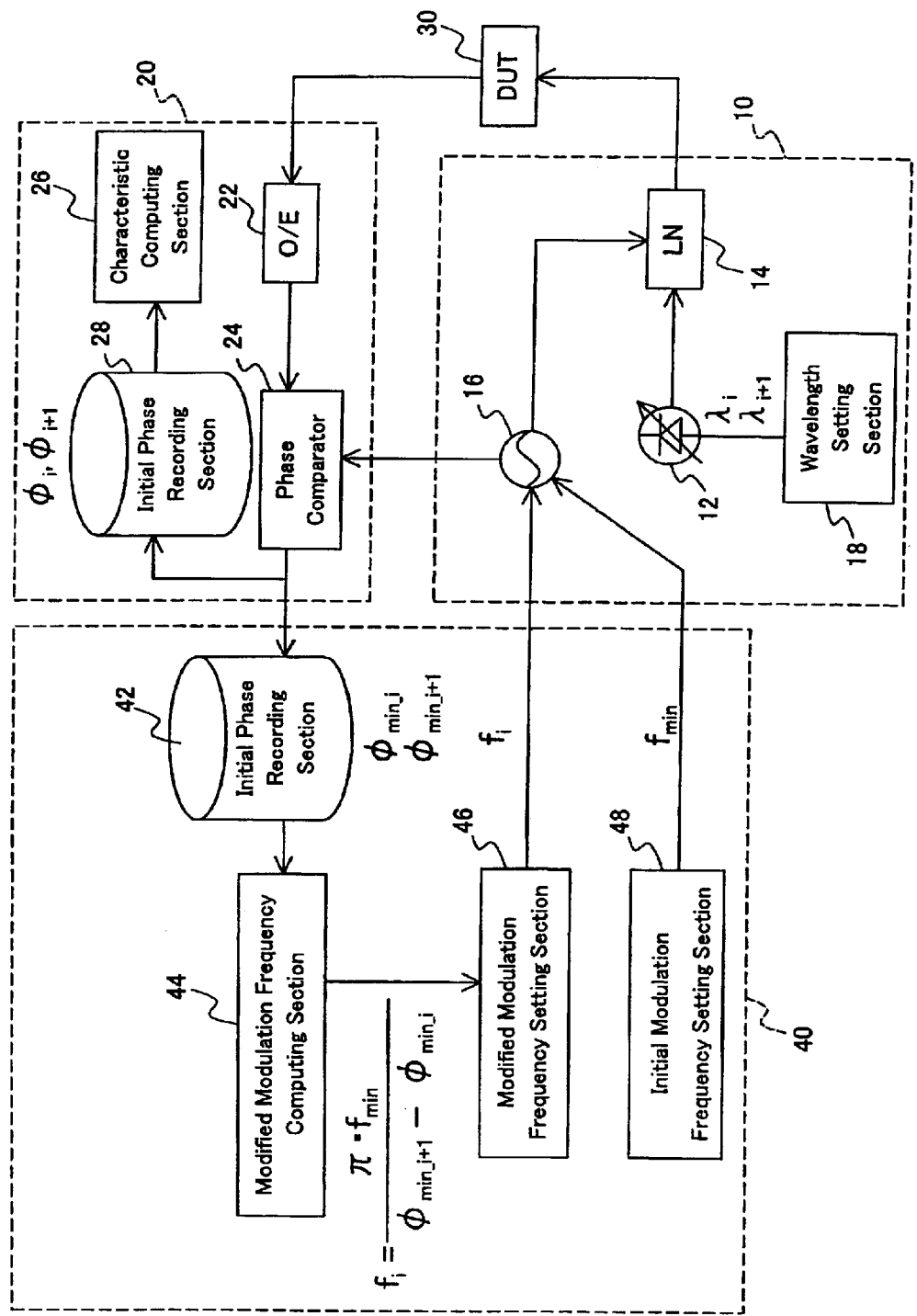
FIG. 1 is a block diagram showing the configuration of an optical characteristic measuring apparatus related to the first preferred embodiment of the present invention.

FIG. 1 is a block diagram showing the configuration of the optical characteristic measuring apparatus related to the first preferred embodiment of the present invention. The optical characteristic measuring apparatus related to the preferred embodiments of the present invention includes a light source system 10 for introducing light to the DUT 30, a characteristic measuring system 20 for receiving light having transmitted the DUT 30 and measuring the characteristics of the DUT 30, and a modulation frequency setting system 40 for setting the modulation frequency.

The light source system 10 includes a variable wavelength light source 12, an optical modulator 14, a modulating power source 16, and a wavelength setting section 18.

The variable wavelength light source 12 generates a variable wavelength light. The wavelength of the variable wavelength light varies discretely by means of the wavelength setting section 18 between the first wavelength of $\lambda i$ and the second wavelength of $\lambda i+1$. The light modulator 14 modulates the variable wavelength light with the frequency of electrical signals generated by the modulation power supply 16 and supplies the variable wavelength light to the DUT 30. In the meanwhile, the light modulator 14 includes LN (lithium niobate). The modulation power source 16 generates electrical signals for modulating the frequencies set by the modulation frequency setting system 40. The electrical signals for modulation are supplied to the light modulator 14 and the phase comparator 24 described below. The wavelength setting section 18 sets discretely the wavelength of variable wavelength lights at the first wavelength $\lambda i$ and the second wavelength $\lambda i+1$.

The DUT 30 is for example an optical fiber. The incident light supplied to the DUT 30 transmits the DUT 30. The incident light transmitting the DUT 30 is called "transmitted light."

The characteristic measuring system 20 includes an optical/electrical converter 22, a phase comparator 24, a characteristic computing section 26 and a modified phase recording section 28.

The optical/electrical converter 22 converts the transmitted light through the optical/electrical conversion process and generates electrical signals which are outputted to the phase comparator 24. The phase comparator 24 measures the phase difference between the electrical signals obtained by converting the transmitted light through the optical/electrical conversion process and the electrical signals for modulation. The modified phase recording section 28 records the first modified phase $\phi i$ and the second modified phase $\phi i+1$ respectively corresponding to the first wavelength $\lambda i$ and the second wavelength $\lambda i+1$ of the incident light when the modified modulation frequency setting section 46 described later sets the frequency of the modulation power source 16 at fi. The characteristic computing section 26 computes the group delay characteristic and the wavelength dispersion characteristic of the DUT 30 from the first modified phase $\phi i$ and the second modified phase $\phi i+1$ recorded at the modified phase recording section 28. The group delay characteristic can be computed from the relationship between the phase measured by the phase comparator 24 and the modulation frequency fi. The wavelength dispersion characteristic can be obtained by differentiating the group delay characteristic by the wavelength.

The modulation frequency setting system 40 includes an initial phase recording section 42, a modified modulation frequency computing section 44, a modified modulation frequency setting section 46, and an initial modulation frequency setting section 48. The initial phase recording section 42 records the first initial phase $\phi\text{min}\_i$ and the second initial phase $\phi\text{min}\_i+1$ respectively corresponding to the first wavelength $\lambda i$ and the second wavelength $\lambda i+1$ of the incident light when the initial modulation frequency setting section 48 described later sets the frequency of the modulation power source 16 at fmin. The modified modulation frequency computing section 44 computes the modified modulation frequency fi. The modified modulation frequency setting section 46 sets the modified modulation frequency fi as the frequency of the electrical signals for modulation generated by the modulation power source 16. The initial modulation frequency setting section 48 sets the initial modulation frequency fmin as the frequency of the electrical signals for modulation generated by the modulation power source 16. The initial modulation frequency fmin is normally set at a small value so that the difference between the first initial phase $\phi\text{min}\_i$ and the second initial phase $\phi\text{min}\_i+1$ may be easily contained within a range of $-\pi$ to $\pi$ or 0 to $2\pi$.

Figure 2:
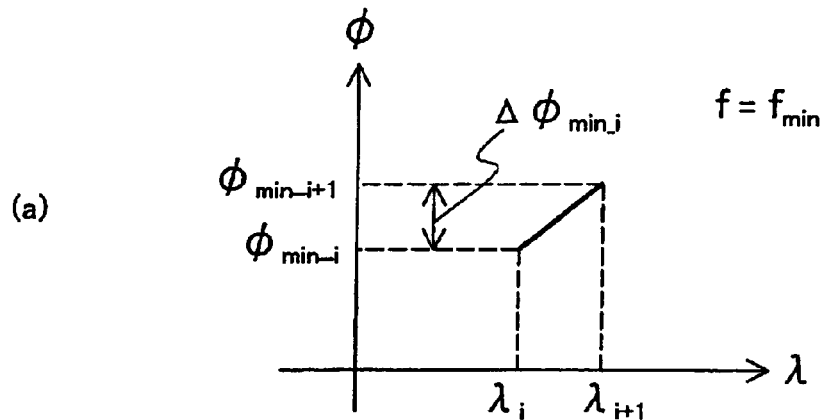
FIG. 2 is an illustration describing the principle of how the modified modulation frequency computing section 44 computes the modified modulation frequency fi.
Figure 2:
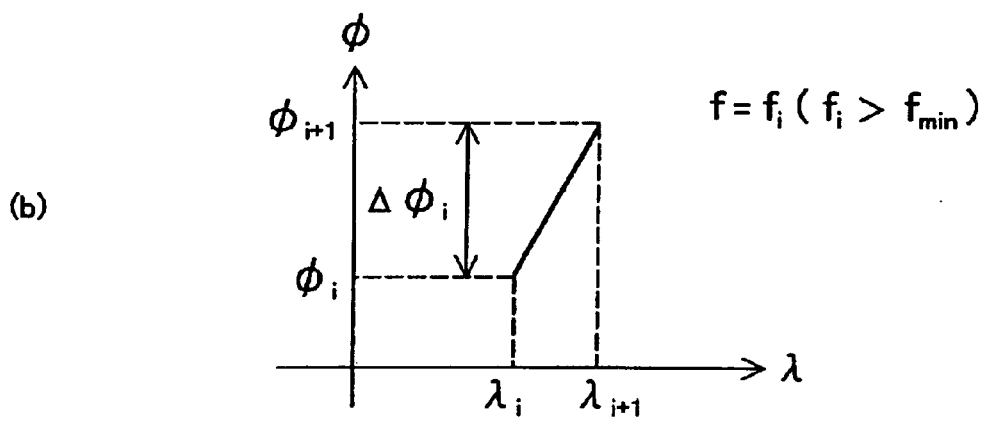

Here, the principle of how the modified modulation frequency computing section 44 computes the modified modulation frequency fi will be explained with reference to FIG. 2. FIG. 2(*a*) shows the relationship between the phase and the wavelength when the modulation frequency is the initial modulation frequency fmin. As FIG. 2(*a*) shows, the difference between the first initial phase $\phi\text{min}\_i$ and the second initial phase $\phi\text{min}\_i+1$ is $\Delta\phi\text{min}\_i$ and is small. Here, when the modulation frequency f is replaced by the modified modulation frequency fi (fi>fmin), as shown in FIG. 2(*b*), the difference between the first modified phase $\phi i$ and the second modified phase $\phi i+1$ is $\Delta\phi i$ and is large. This is because, as shown in FIG. 2(*c*), $\Delta\phi i$ and $\Delta\phi\text{min}\_i$ are proportionate to fi/fmin. However, there will be measurement errors unless $\Delta\phi i$ is within the given range. In other words, in case where the measurable range of the phase comparator 24 is between $-\pi$ and $\pi$, if $\Delta\phi i$ exceeds $\pi$, there will errors in the measurement of the phase comparator 24. Therefore, when $\Delta\phi i$ must not exceed $\pi$, in the formula of FIG. 2(*c*) the computation of the modified modulation frequency fi by supposing $\Delta\phi i=\pi$ will give the modified modulation frequency fi as shown in FIG. 2(*d*). If such modified modulation frequency fi is used to modulate the incident light, the difference between the first modified phase $\phi i$ and the second modified phase $\phi i+1$ will be approximately $\pi$ and will be greater than the phase difference of the initial phase $\Delta\phi\text{min}\_i$.

Figure 3:
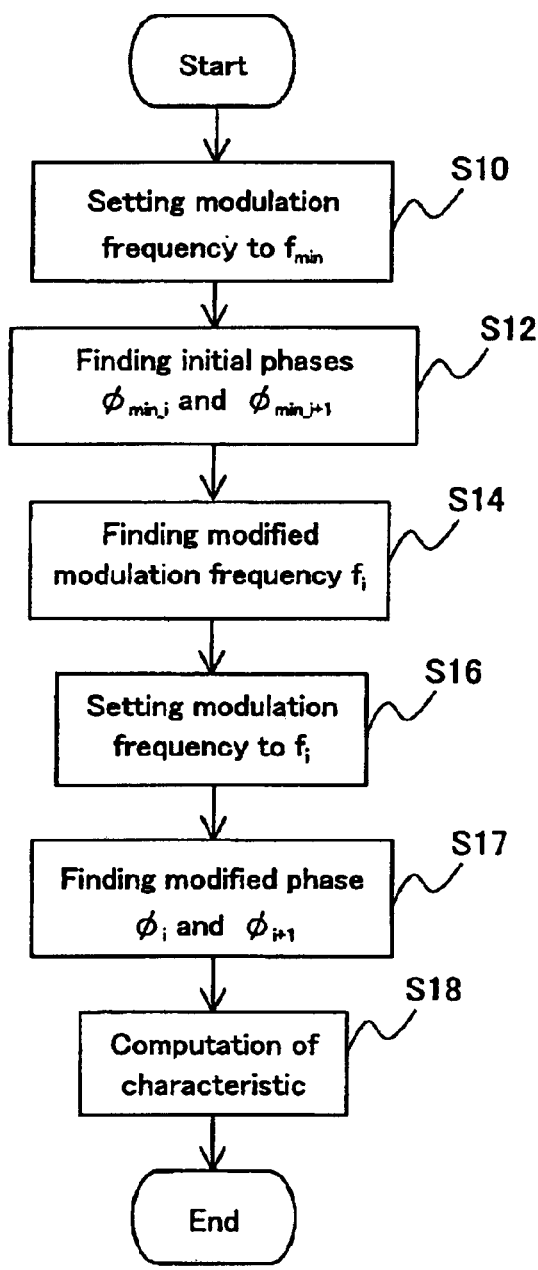
FIG. 3 is a flowchart showing the operation of the first preferred embodiment of the present invention.

And now the operation of the first embodiment will be described. FIG. 3 is a flow chart showing the operation of the first embodiment. To begin with, the initial modulation frequency setting section 48 sets the initial modulation frequency fmin as the frequency of the electrical signals for modulation generated by the modulation power source 16 (S10).

And the wavelength setting section 18 sets the frequency of the variable wavelength light generated by the variable wavelength light source 12 at the first wavelength $\lambda i$ and the second wavelength $\lambda i+1$. The light modulator 14 is supplied with the electrical signals for modulation generated by the modulation power source 16. The variable wavelength light is modulated by the frequency fmin of the electrical signals for modulation at the light modulator 14 to be supplied to the DUT 30. The transmitted light that has transmitted the DUT 30 is converted by the optical/electrical conversion process by the optical/electrical converter 22 to be supplied to the phase comparator 24. The phase comparator 24 measures the phase differences between the phase of the electrical signals outputted by the optical/electrical converter 22 and the phase of the electrical signals for modulation generated by the modulation power source 16. These phase differences are the first initial phase $\phi\text{min}\_i$ and the second initial phase $\phi\text{min}\_i+1$.

In other words, the phase comparator 24 measures the first initial phase $\phi\text{min}\_i$ and the second initial phase $\phi\text{min}\_i+1$ (S12). The first initial phase $\phi\text{min}\_i$ and the second initial phase $\phi\text{min}\_i+1$ are recorded at the initial phase recording section 42. The modified modulation frequency computing section 44 reads the first initial phase $\phi\text{min}\_i$ and the second initial phase $\phi\text{min}\_i+1$ from the initial phase recording section 42 and computes a modified modulation frequency fi (S14). The modified modulation frequency fi can be computed by using the formula shown in FIG. 2(*d*) when it is desired to limit $\Delta\phi i$ at a value equal to or less than $\pi$. If it is desired to keep $\Delta\phi i$ at a given value other than $\pi$, it is possible to compute the value of the modified modulation frequency fi by multiplying the given value by fmin/$\Delta\phi\text{min}$ as shown in FIG. 2(*e*).

The modified modulation frequency fi is sent from the modified modulation frequency computing section 44 to the modified modulation frequency setting section 46. The modified modulation frequency setting section 46 sets the modified modulation frequency fi as the frequency of the electrical signals for modulation generated by the modulation power source 16 (S16).

Then, the wavelength setting section 18 sets the wavelength of the variable wavelength light generated by the variable wavelength light source 12 at the first wavelength $\lambda i$ and the second wavelength $\lambda i+1$. The light modulator 14 is supplied with the electrical signals for modulation generated by the modulation power source 16. The variable wavelength light is modulated with the frequency fi of the electrical signals for modulation at the light modulator 14 to be supplied to the DUT 30. The transmitted light having transmitted the DUT 30 is converted by the optical/electrical conversion process by the optical/electrical converter 22 to be supplied to the phase comparator 24. The phase comparator 24 measures the phase differences between the phase of the electrical signals outputted by the optical/electrical converter 22 and the phase of the electrical signals for modulation generated by the modulation power source 16. These phase differences are the first initial phase $\phi i$ and the second initial phase $\phi i+1$. In other words, the phase comparator 24 seeks the first modified phase $\phi i$ and the second modified phase $\phi i+1$ (S17). The first modified phase $\phi i$ and the second modified phase $\phi i+1$ are recorded at the modified phase recording section 28. And the characteristic computing section 26 reads the first modified phase $\phi i$ and the second modified phase $\phi i+1$ from the modified phase recording section 28 to compute the group delay or the wavelength dispersion of the DUT 30 (S18).

According to the first embodiment, it is possible to compute by means of the modified modulation frequency computing section 46 a modified modulation frequency fi that will leave the phase difference between the first modified phase $\phi i$ and the second modified phase $\phi i+1$ at a given phase value, for example at a value equal to or less than π. Therefore, if the frequency for modulating the incident light is set at the modified modulation frequency fi by the modified modulation frequency setting section 46, the phase difference between the first modified phase φi and the second modified phase φi+1 will be the required phase value π, and thus the phase difference can be measured. Moreover, as the frequency for modulating the incident light can be sufficiently large, the measure precision of the phase difference can be enhanced.

The Second Preferred Embodiment

The second preferred embodiment is different from the first preferred embodiment in that the modified modulation frequency fi itself is not chosen as the frequency of the electrical signals for modulation.

Figure 4:
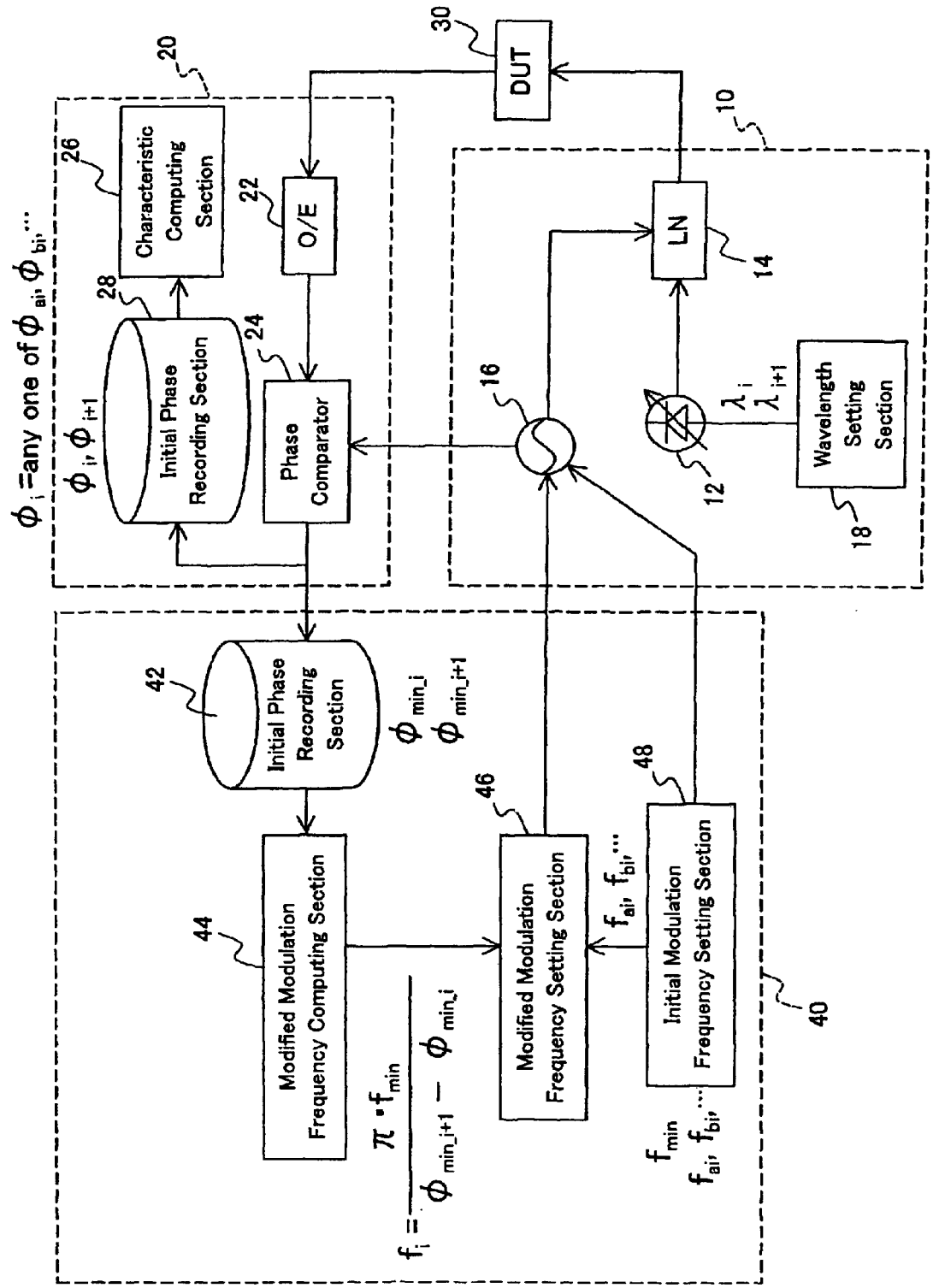
FIG. 4 is a block diagram showing the configuration of an optical characteristic measuring apparatus related to the second preferred embodiment of the present invention.

FIG. 4 is a block diagram showing the configuration of an optical characteristic measuring apparatus relating to the second preferred embodiment of the present invention. The optical characteristic measuring apparatus relating to the preferred embodiment includes a light source system 10 introducing light into the DUT 30, a characteristic measuring system 20 for receiving the light having transmitted the DUT 30 and measuring the characteristics of the DUT 30, and a modulation frequency setting system 40 for setting the modulation frequency.

The light source system 10 includes a variable wavelength light source 12, a light modulator 14, a modulation power source 16 and a wavelength setting section 18.

The variable wavelength light source 12 generates variable wavelength light. The wavelength of the variable wavelength light varies discretely such as the first wavelength λi and the second wavelength λi+1 by the operation of the wavelength setting section 18. The light modulator 14 modulates the variable wavelength light by the frequency of the electrical signals generated by the modulation power source 16 which will be supplied to the DUT 30. Incidentally, the light modulator 14 includes LN (lithium niobate). The modulation power source 16 generates electrical signals for modulating the frequencies set by the modulation frequency setting system 40. The electrical signals for modulation is supplied to the light modulator 14 and the phase comparator 24 described later. The wavelength setting section 18 sets discretely the frequency of variable wavelength light, for example, at the first wavelength λi and at the second wavelength λi+1.

The DUT 30 is for example an optical fiber. The incident light supplied to the DUT 30 transmits the DUT 30. The incident light transmitting the DUT 30 is called "transmitted light."

The characteristic measuring system 20 includes an optical/electrical converter 22, a phase comparator 24, a characteristic computing section 26 and a modified phase recording section 28.

The optical/electrical converter 22 converts the transmitted light by the optical/electrical conversion process and generates electrical signals which will then be supplied to the phase comparator 24. The phase comparator 24 measures the phase difference between the electrical signals obtained by converting by the optical/electrical conversion process the transmitted light and the electrical signals for modulation. The modified phase recording section 28 records the first modified phase φi and the second modified phase φi+1 respectively corresponding to the first wavelength λi and the second wavelength λi+1 of the incident light when the modified modulation frequency setting section 46 sets the frequency of the modulation power source 16 at any one of fai, fbi, . . . . Incidentally, fai, fbi, . . . will be described later. The characteristic computing section 26 computes the group delay characteristic and the wavelength dispersion characteristic of the DUT 30 from the first modified phase φi and the second modified phase φi+1 recorded in the modified phase recording section 28. The group delay characteristic can be computed from the relationship between the phase measured by the phase comparator 24 and the modified frequency (any one of fai, fbi, . . . ). The wavelength dispersion characteristic can be computed by differentiating the group delay characteristic by the wavelength.

The modulation frequency setting system 40 includes an initial phase recording section 42, a modified modulation frequency computing section 44, a modified modulation frequency setting section 46, and an initial modulation frequency setting section 48. The initial phase recording section 42 records the first initial phase φmin_i and the second initial phase φmin_i+1 respectively corresponding to the first wavelength λi and the second wavelength λi+1 of the incident light when the initial modulation frequency setting section 48 described later sets the frequency of the modulation power source 16 at fmin. The modified modulation frequency computing section 44 computes the modified modulation frequency fi. The modified modulation frequency setting section 46 sets the maximum below the modified modulation frequency fi within fai, fbi, . . . as the frequency of the electrical signals for modulation generated by the modulation power source 16. The initial modulation frequency setting section 48 sets the initial modulation frequencies fmin, fai, fbi, . . . as the frequency of the electrical signals for modulation generated by the modulation power source 16. Incidentally, the initial modulation frequency fmin is normally set at a small value so that the difference between the first initial phase φmin_i and the second initial phase φmin_i+1 may be contained with sufficient margin within the range between −π and π or between 0 and 2π. And fai, fbi, . . . are set at a larger value than fmin. For this reason, the initial modulation frequency fmin is called the minimum initial modulation frequency fmin.

Here, the method by which the modified modulation frequency setting section 46 sets the frequency of the electrical signals for modulation at any one of fai, fbi, . . . based on the modified modulation frequency fi will be described with reference to FIG. 2. FIG. 2(a) shows the relations between the phase and the wavelength when the modulation frequency f is the initial modulation frequency fmin. As FIG. 2(a) shows, the difference between the first initial phase φmin_i and the second initial phase φmin_i+1 is Δφmin_i and is small. When the modulation frequency f is replaced by the modified modulation frequency fi (fi>fmin), as shown in FIG. 2(b), the difference between the first modified phase φi and the second modified phase φi+1 is Δφi and is large. This is because, as shown in FIG. 2(c), Δφi and Δφmin_i are proportionate to fi/fmin. However, there will measurement errors unless Δφi is within a given range. In other words, in case where the measurable range of the phase comparator 24 is between −π and π, if Δφi exceeds π, there will errors in the measurement of the phase comparator 24. Therefore, for example, when Δφi must not exceed π, in the formula of FIG. 2(c) the computation of the modified modulation frequency fi by supposing Δφi=π will give the modified modulation frequency fi as shown in FIG. 2(d).

Then, the modified modulation frequency setting section 46 sets the maximum below the modified modulation frequency fi among fai, fbi, . . . as the modulation frequency. The modulation of the incident light by means of such a modulation frequency will produce the maximum value at or below π for the phase difference between the first modified phase φi and the second modified phase φi+1, which will be larger than the phase difference Δφmin_i for the initial phase.

Figure 5:
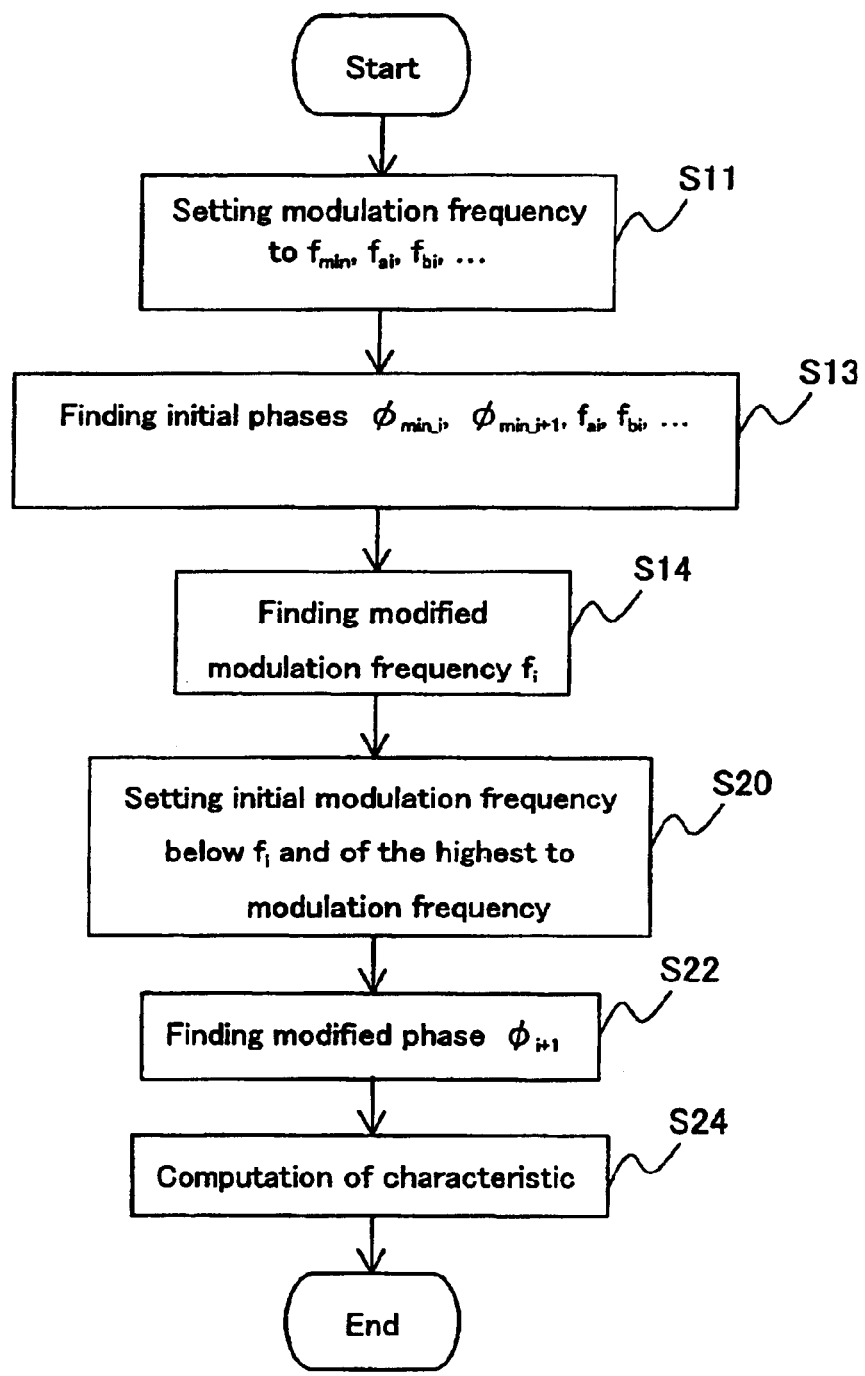
FIG. 5 is a flowchart showing the operation of the second preferred embodiment.

Then, the operation of the second embodiment will be described. FIG. 5 is a flow chart showing the operation of the second embodiment. To begin with, the initial modulation frequency setting section 48 sets the initial modulation frequencies fmin, fai, fbi, . . . as the frequency of the electrical signals for modulation generated by the modulation power source 16 (S11).

And the wavelength setting section 18 sets the wavelength of the variable wavelength light generated by the variable wavelength light source 12 at the first wavelength λi and the second wavelength λi+1. The light modulator 14 is supplied with the electrical signals for modulation generated by the modulation power source 16. The variable wavelength light is modulated by the frequency fmin, fai, fbi, . . . of the electrical signals for modulation at the light modulator 14 and is supplied to the DUT 30. The transmitted light that has transmitted the DUT 30 is converted by the optical/electrical conversion process by the optical/electrical converter 22 to be supplied to the phase comparator 24. The phase comparator 24 measures the phase differences between the phase of the electrical signals outputted by the optical/electrical converter 22 and the phase of the electrical signals for modulation generated by the modulation power source 16. Among these phase differences, the phase differences corresponding to the incident light modulated by the minimum initial modulation frequency fmin are the first initial phase φmin_i and the second initial phase φmin_i+1. And when the frequencies of the electrical signals for modulation are fai, fbi, . . . , the phase differences measured by the phase comparator 24 are φai, φbi, . . . .

In other words, the phase comparator 24 computes the first initial phase φmin_i, the second initial phase φmin_i+1 and the initial phases φai, φbi, . . . (S13). The first initial phase φmin_i and the second initial phase φmin_i+1 are recorded in the initial phase recording section 42. The initial phases φai, φbi, . . . are recorded in the modified phase recording section 28.

Figure 6:
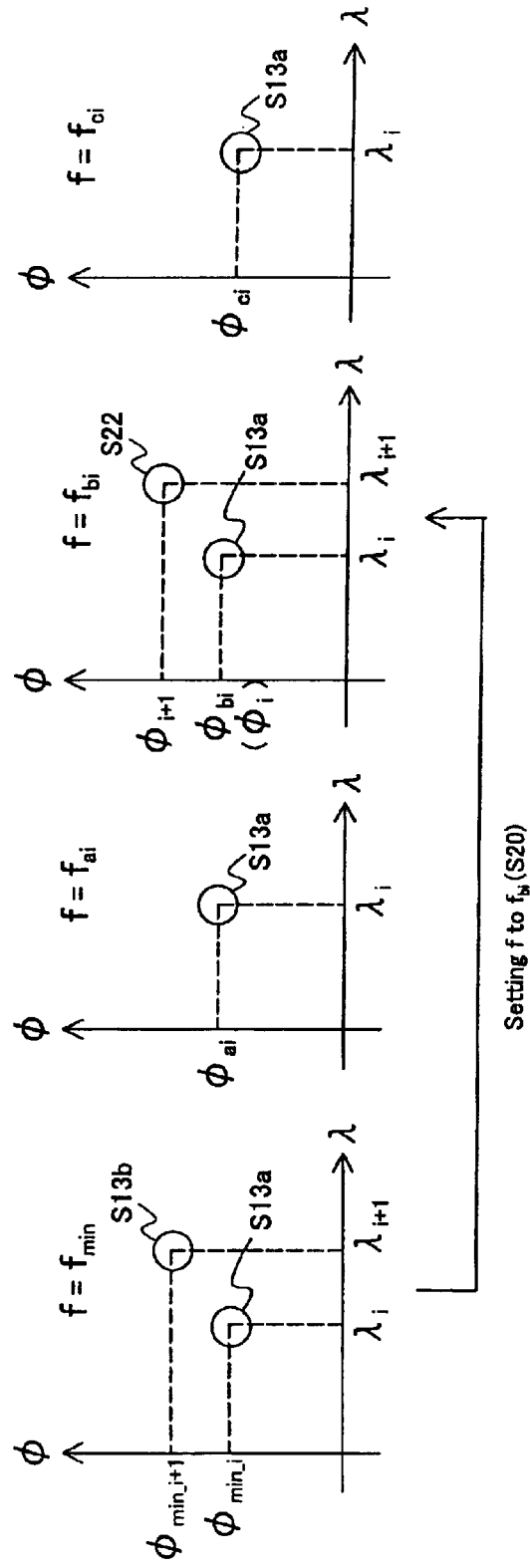
FIG. 6 is a phase-wavelength diagram showing the operation of the second preferred embodiment.

Here, the method of computing the first initial phase φmin_i, the second initial phase φmin_i+1 and the initial phases φai, φbi, . . . will be described in greater detail with reference to FIG. 6. To begin with, the wavelengths of the variable wavelength light are set at the first wavelength λi and the variable frequencies are switched from fmin to fai, fbi, fci, . . . . And the first initial phase φmin_i and the initial phases φai, φbi, φci, . . . are measured (S13a). Incidentally, S13a means the first step of S13 shown in FIG. 5. Then, the wavelength of the variable wavelength light is set at the second wavelength of λi+1, and the second initial phase φmin_i+1 is measured (S13b). S13b means the last step of S13 shown in FIG. 5.

Back in FIG. 5, the modified modulation frequency computing section 44 reads the first initial phase φmin_i and the second initial phase φmin_i+1 from the initial phase recording section 42, and computes the modified modulation frequency fi (S14). When it is desired to limit the value of Δφi at a value equal to or below π, the modified modulation frequency fi can be computed by means of the formula shown in FIG. 2(d). If it is desired to contain Δφi at a value other than π, it is possible to compute the modified modulation frequency fi by multiplying the given value by fmin/Δφmin as shown in FIG. 2(e).

The modified modulation frequency fi is sent from the modified modulation frequency computing section 44 to the modified modulation frequency setting section 46. And equally the initial modulation frequencies fmin, fai, fbi, . . . are sent from the initial modulation frequency setting section 48 to the modified modulation frequency setting section 46. There, the modified modulation frequency setting section 46 sets the maximum frequency at or below the modified modulation frequency fi among the initial modulation frequencies fmin, fai, fbi, . . . as the frequency of the electrical signals for modulation generated by the modulation power source 16 (S20). For example, fai<fbi<fi<fci. In such a case, as shown in FIG. 6, the modified modulation frequency setting section 46 sets fbi as the frequency of the electrical signals for modulation generated by the modulation power source 16.

Then, the wavelength setting section 18 sets the wavelength of the variable wavelength light generated by the variable wavelength light source 12 at the second wavelength λi+1. The light modulator 14 is supplied with the electrical signals for modulation generated by the modulation power source 16. The variable wavelength light is modulated at the light modulator 14 by the frequency set by the modified modulation frequency setting section 46 (any one among fai, fbi, . . . ) of the electrical signals for modulation and is supplied to the DUT 30. The transmitted light that has transmitted the DUT 30 is converted by the optical/electrical conversion process by the optical/electrical converter 22 and is supplied to the phase comparator 24. The phase comparator 24 measures the phase differences between the phase of the electrical signals outputted by the optical/electrical converter 22 and the phase of the electrical signals for modulation generated by the modulation power source 16. This phase difference is the second modified phase φi+1. Namely, the phase comparator 24 computes the second modified phase φi+1 (S22).

The method whereby the phase comparator 24 computes the second modified phase φi+1 will be described in greater details with reference to FIG. 6. To begin with, let us suppose that the modified modulation frequency setting section 46 has set fbi as the frequency of the electrical signals for modulation generated by the modulation power source 16. And the phase comparator 24 computes the second modified phase φi+1 (S22). In this case, since the second wavelength λi+1 has been chosen as the wavelength of the variable wavelength light, the phase at the time when the modulation frequency is fbi and the wavelength of the variable wavelength light is λi+1 is measured. In this case, for any frequencies other than f=fbi, the phase at the time when the wavelength of the variable wavelength light is the second wavelength λi+1 is not measured.

The second modified phase φi+1 is recorded in the modified phase recording section 28. Here, the first modified phase φi corresponds to the modulation frequency set by the modified modulation frequency setting section 46 among the initial phases φai, φbi, . . . . For example, if the modified modulation frequency setting section 46 has set fbi as the modulation frequency as shown in FIG. 6, the first modified phase φi is the initial phase φbi. Therefore, we can assume that the first modified phase φi has already been recorded in the modified phase recording section 28. Therefore, the characteristic computing section 26 reads the first modified phase φi and the second modified phase φi+1 from the modified phase recording section 28 and computes the group delay or the wavelength dispersion of the DUT 30 (S24).

According to the second embodiment, it is possible to compute by means of the modified modulation frequency computing section 46 a modified modulation frequency fi so that the phase difference between the first modified phase φi and the second modified phase φi+1 could be equal to or below the given phase value, for example π. And if the maximum frequency equal to or below the modified modulating frequency fi among the initial modulation frequencies fai, fbi, . . . is adopted for the frequency for modulating the incident light by the modified modulation frequency setting section 46, the phase difference between the first modified phase φi and the second modified phase φi+1 is equal to or below the given phase value π, and therefore it is possible to measure the phase difference. Moreover, the possibility of choosing a sufficiently wide frequency for modulating the incident light enables to enhance the precision of measurements.

In addition, the fact that the wavelength of the variable wavelength light is changed for once can economize the time required for changing wavelength. For example, let us suppose that it takes about 3 secs to change the wavelength of the variable wavelength light and about 10 ms to change the modulation frequency. Then, as the time required to change the wavelength is considerably longer than that to change the modulation frequency, it is effective to economize the time required to change the wavelength.

The Third Preferred Embodiment

In comparison with the first and the second preferred embodiment wherein there are two wavelengths of the variable wavelength light set by the wavelength setting section 18, the third preferred embodiment is different in that there are three or more wavelengths of the variable wavelength light set by the wavelength setting section 18.

Figure 7:
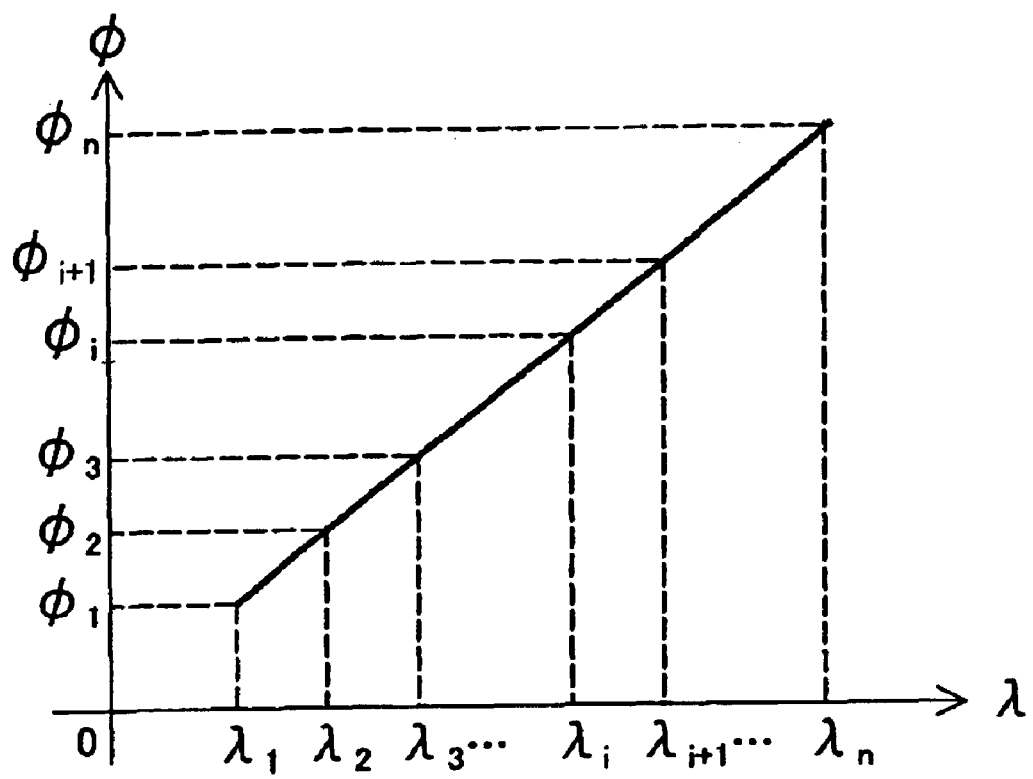
FIG. 7 shows the relationship between the phases measured by the phase comparator 24 and the wavelengths of the variable wavelength light when there are three or more wavelengths of the variable wavelength light in the third preferred embodiment through the sixth preferred embodiment.

FIG. 7 shows the relationship between the phase measured by the phase comparator 24 and the wavelength of the variable wavelength light when there are three or more wavelengths of the variable wavelength light. The wavelength of the variable wavelength light varies within a range between λ1 and λn. Preferably λ1, λ2, λ3, . . . λi, λi+1, . . . λn are at equal intervals. In other words, λ2−λ1=Δλ, the first wavelength being represented by λ1 and the second wavelength being represented by λ2. Then, λ2 is taken as the first wavelength and the second wavelength λ3 is taken so that λ3−λ2=Δλ. Thereafter, this process is repeated until λn is reached.

Such a method of setting the wavelength of variable wavelength light is common with the third through sixth embodiments.

The configuration of the third embodiment is similar to that of the first embodiment, and its description is omitted.

Figure 8:
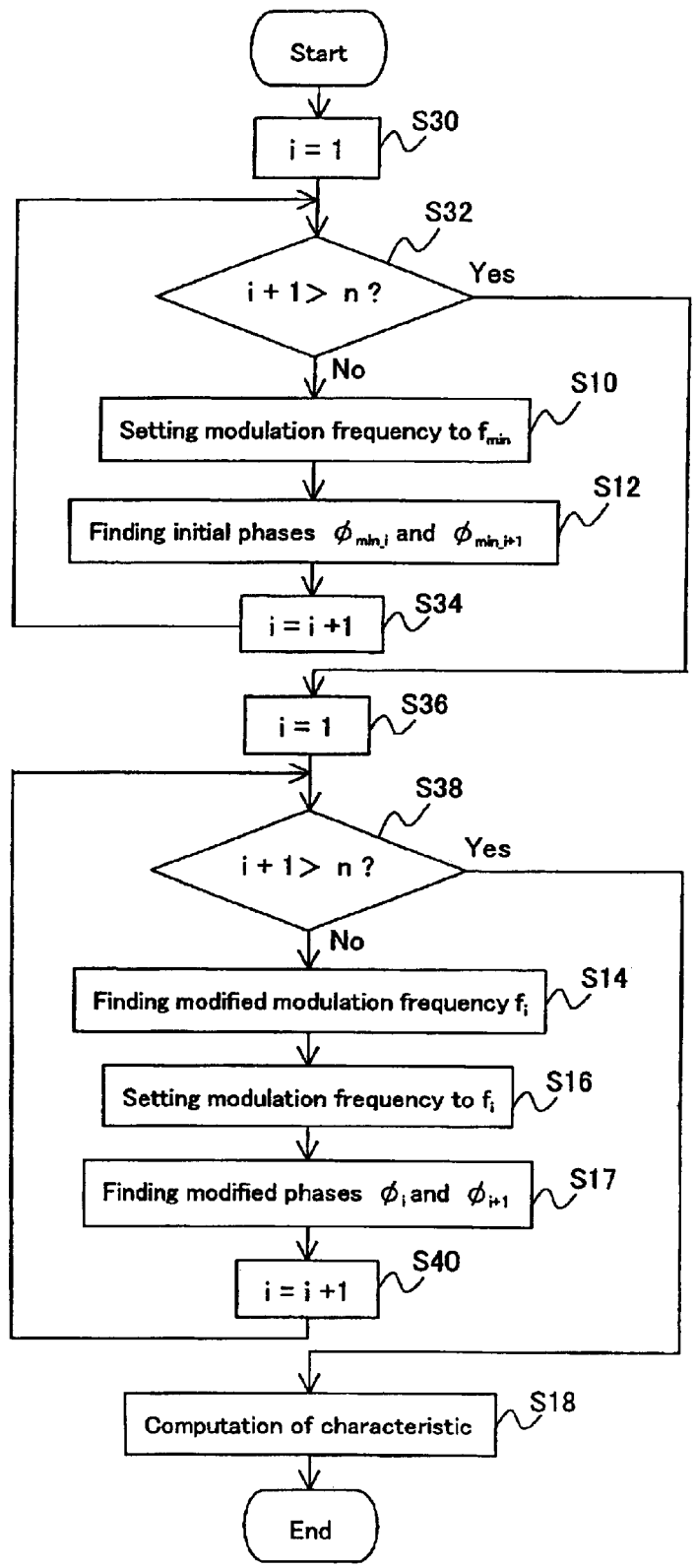
FIG. 8 is a flowchart showing the operation of the third preferred embodiment.

And now the operation of the third embodiment will be described. FIG. 8 is a flowchart showing the operation of the third embodiment. To begin with, the argument i for deciding the type of the wavelength λ is set at 1 (S30). Then, the question of whether the argument i plus 1 has exceeded n is determined (S32). If the argument i plus 1 has not exceeded n (S32, No), the initial modulation frequency setting section 48 sets the initial modulation frequency fmin as the frequency of the electrical signals for modulation generated by the modulation power source 16 (S10). And the wavelength setting section 18 sets the wavelength of the variable wavelength light generated by the variable wavelength light source 12 at the first wavelength λi and the second wavelength λi+1. The light modulator 14 is supplied with the electrical signals for modulation generated by the modulation power source 16. The variable wavelength light is modulated by the frequency fmin of the electrical signals for modulation at the light modulator 14 and is supplied to the DUT 30. The transmitted light that has transmitted the DUT 30 is converted by the optical/electrical conversion process by the optical/electrical converter 22 and is supplied to the phase comparator 24. The phase comparator 24 measures the phase differences between the phase of the electrical signals outputted by the optical/electrical converter 22 and the phase of the electrical signals for modulation generated by the modulation power source 16. These phase differences are the first initial phase φmin_i and the second initial phase φmin_i+1.

In other words, the phase comparator 24 computes the first initial phase φmin_i and the second initial phase φmin_i+1 (S12). The first initial phase φmin_i and the second initial phase φmin_i+1 are recorded in the initial phase recording section 42.

And 1 is added to the argument i (S34), and the process returns to the determination whether the argument i has exceeded n (S32). If the argument i plus 1 has exceeded n (S32, Yes), the wavelength of the variable wavelength light has been changed, and the argument i for deciding the type of wavelength λ will be again set at 1 (S36). Then, the process returns to the determination of whether the argument i plus 1 has exceeded n (S38). If the argument i plus 1 has not exceeded n (S38, No), the modified modulation frequency computing section 44 reads the first initial phase φmin_i and the second initial phase λmin_i+1 from the initial phase recording section 42 and computes the modified modulation frequency fi (S14). When it is desired to limit the value of Δφi at a value equal to or below π, the modified modulation frequency fi can be computed by using the formula shown in FIG. 2(d). When it is desired to contain the Δφi at a given value other than π, the modified modulation frequency fi can be computed by multiplying the given value by fmin/Δφmin as shown in FIG. 2(e).

The modified modulation frequency fi is sent from the modified modulation frequency computing section 44 to the modified modulation frequency setting section 46. The modified modulation frequency setting section 46 sets the modified modulation frequency fi as the frequency of the electrical signals for modulation generated by the modulation power source 16 (S16).

Then, the wavelength setting section 18 sets the wavelength of the variable wavelength light generated by the variable wavelength light source 12 at the first wavelength λi and the second wavelength λi+1. The light modulator 14 is supplied with the electrical signals for modulation generated by the modulation power source 16. The variable wavelength light is modulated by the frequency fi of the electrical signals for modulation at the light modulator 14 and is supplied to the DUT 30. The transmitted light that has transmitted the DUT 30 is converted by the optical/electrical conversion process by the optical/electrical converter 22 and is supplied to the phase comparator 24. The phase comparator 24 measures the phase differences between the phase of the electrical signals outputted by the optical/electrical converter 22 and the phase of the electrical signals for modulation generated by the modulation power source 16. These phase differences are the first modified phase φi and the second modified phase φi+1. In other words, the phase comparator 24 computes the first modified phase φi and the second modified phase φi+1 (S17). The first modified phase φi and the second modified phase φi+1 are recorded in the modified phase recording section 28.

Then, 1 is added to the argument i (S40) and the process returns to the determination of whether the argument i has exceeded n (S38). If the argument i plus 1 has exceeded n (S38, Yes), the wavelength of the variable wavelength light has already changed. Therefore, the characteristic computing section 26 reads the first modified phase φi and the second modified phase φi+1 from the modified phase recording section 28, and computes the group delay or the wavelength dispersion of the DUT 30 (S18).

According to the third preferred embodiment, it is possible to measure the characteristics of the DUT 30 even if three or more wavelengths of the variable wavelength light are changed.

The Fourth Preferred Embodiment

In comparison with the first and the second embodiments wherein the wavelength setting section 18 sets two wavelengths of the variable wavelength light, the fourth embodiment is different in that it has three or more wavelengths of the variable wavelength light set by the wavelength setting section 18.

Also in comparison with the third preferred embodiment wherein the modified modulation frequency is computed after all the first wavelength λi and the second wavelength λi+1 have been set, in other words after all the initial phases have been measured, the fourth preferred embodiment is different in that the modified modulation frequency is computed after each setting of the first wavelength λi and the second wavelength λi+1.

The configuration of the fourth preferred embodiment is similar to that of the first embodiment and its description is omitted.

Figure 9:
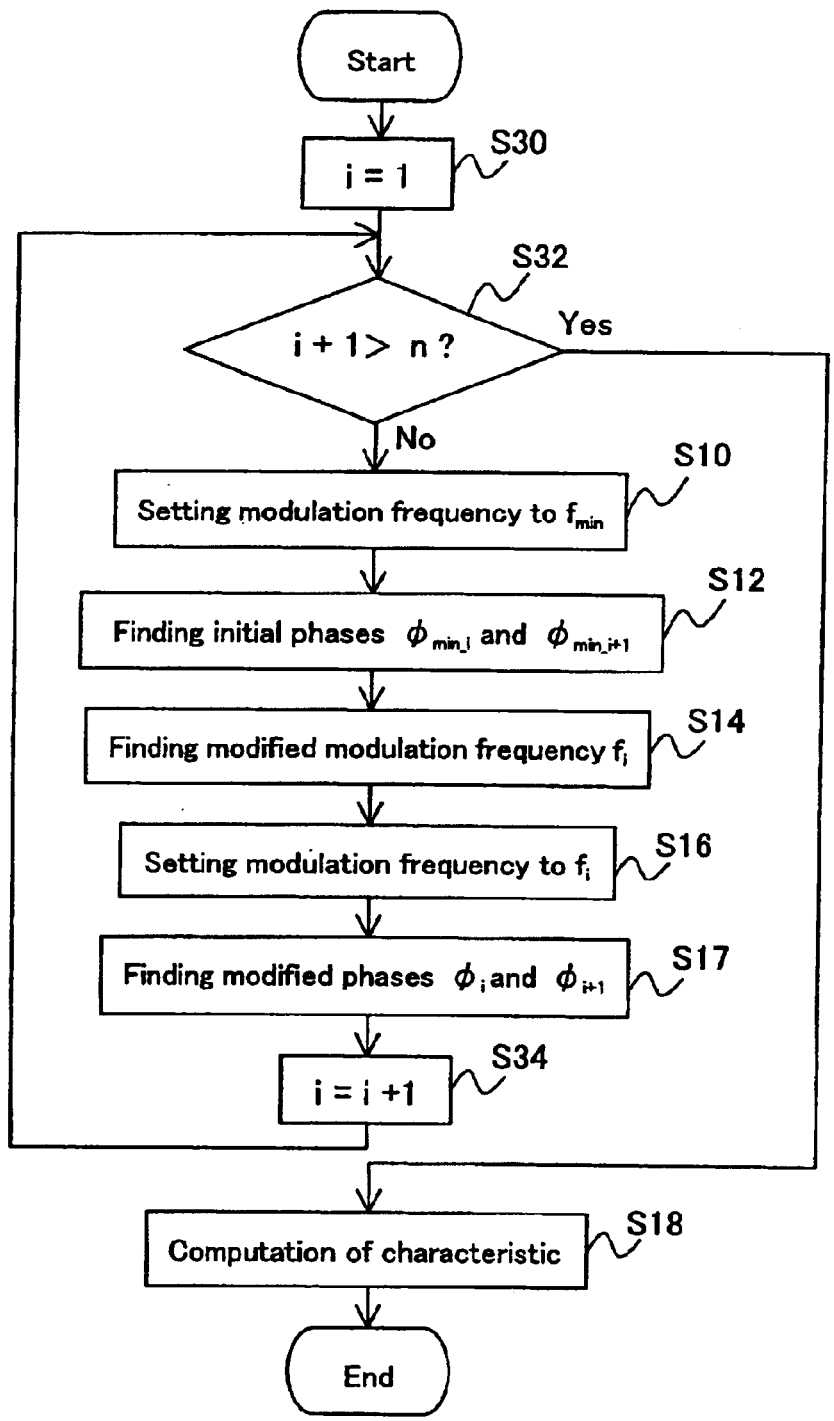
FIG. 9 is a flowchart showing the operation of the fourth preferred embodiment.

And now the operation of the fourth preferred embodiment will be described. FIG. 9 is a flowchart showing the operation of the fourth preferred embodiment. To begin with, the argument i for deciding the type of the wavelength λ is set at 1 (S30). Then, the question of whether the argument i plus 1 has exceeded n is determined (S32). If the argument i plus 1 has not exceeded n (S32, No), the initial modulation frequency setting section 48 sets the initial modulation frequency fmin as the frequency of the electrical signals for modulation generated by the modulation power source 16 (S10). And the wavelength setting section 18 sets the wavelength of the variable wavelength light generated by the variable wavelength light source 12 at the first wavelength λi and the second wavelength λi+1. The light modulator 14 is supplied with the electrical signals for modulation generated by the modulation power source 16. The variable wavelength light is modulated by the frequency fmin of the electrical signals for modulation at the light modulator 14 and is supplied to the DUT 30. The transmitted light that has transmitted the DUT 30 is converted by the optical/electrical conversion process by the optical/electrical converter 22 and is supplied to the phase comparator 24. The phase comparator 24 measures the phase differences between the phase of the electrical signals outputted by the optical/electrical converter 22 and the phase of the electrical signals for modulation generated by the modulation power source 16. These phase differences are the first initial phase φmin_i and the second initial phase φmin_i+1.

In other words, the phase comparator 24 computes the first initial phase φmin_i and the second initial phase φmin_i+1 (S12). The first initial phase φmin_i and the second initial phase φmin_i+1 are recorded in the initial phase recording section 42.

The modified modulation frequency computing section 44 reads the first initial phase φmin_i and the second initial phase φmin_i+1 from the initial phase recording section 42 and computes the modified modulation frequency fi (S14). When it is desired to limit the value of Δφi at a value equal to or below π, the modified modulation frequency fi can be computed by means of the formula shown in FIG. 2(d). If it is desired to keep Δφi at a value other than π, it is possible to compute the modified modulation frequency fi by multiplying the given value by fmin/Δφmin as shown in FIG. 2(e).

The modified modulation frequency fi is sent from the modified modulation frequency computing section 44 to the modified modulation frequency setting section 46. The modified modulation frequency setting section 46 sets the modified modulation frequency fi as the frequency of the electrical signals for modulation generated by the modulation power source 16 (S16).

Then, the wavelength setting section 18 sets the wavelength of the variable wavelength light generated by the variable wavelength light source 12 at the first wavelength λi and the second wavelength λi+1. The light modulator 14 is supplied with the electrical signals for modulation generated by the modulation power source 16. The variable wavelength light is modulated by the frequency fi of the electrical signals for modulation at the light modulator 14 and is supplied to the DUT 30. The transmitted light that has transmitted the DUT 30 is converted by the optical/electrical conversion process by the optical/electrical converter 22 and is supplied to the phase comparator 24. The phase comparator 24 measures the phase differences between the phase of the electrical signals outputted by the optical/electrical converter 22 and the phase of the electrical signals for modulation generated by the modulation power source 16. Theses phase differences are the first modified phase φi and the second modified phase φi+1. In other words, the phase comparator 24 computes the first modified phase φi and the second modified phase φi+1 (S17). The first modified phase φi and the second modified phase φi+1 are recorded in the modified phase recording section 28.

Then, 1 is added to the argument i (S34) and the process returns to the determination of whether the argument i has exceeded n (S30). If the argument i plus 1 has exceeded n (S32, Yes), the wavelength of the variable wavelength light has already changed. Therefore, the characteristic computing section 26 reads the first modified phase φi and the second modified phase φi+1 from the modified phase recording section 28, and computes the group delay or the wavelength dispersion of the DUT 30 (S18).

According to the fourth preferred embodiment, it is possible to measure the characteristics of the DUT 30 even if three or more wavelengths of the variable wavelength light are changed.

The Fifth Preferred Embodiment

In comparison with the first and the second preferred embodiments wherein the wavelength setting section 18 sets two wavelengths of the variable wavelength light, the fifth preferred embodiment is different in that it has three or more wavelengths of the variable wavelength light set by the wavelength setting section 18.

The configuration of the fifth preferred embodiment is similar to that of the second embodiment and its description is omitted.

Figure 10:
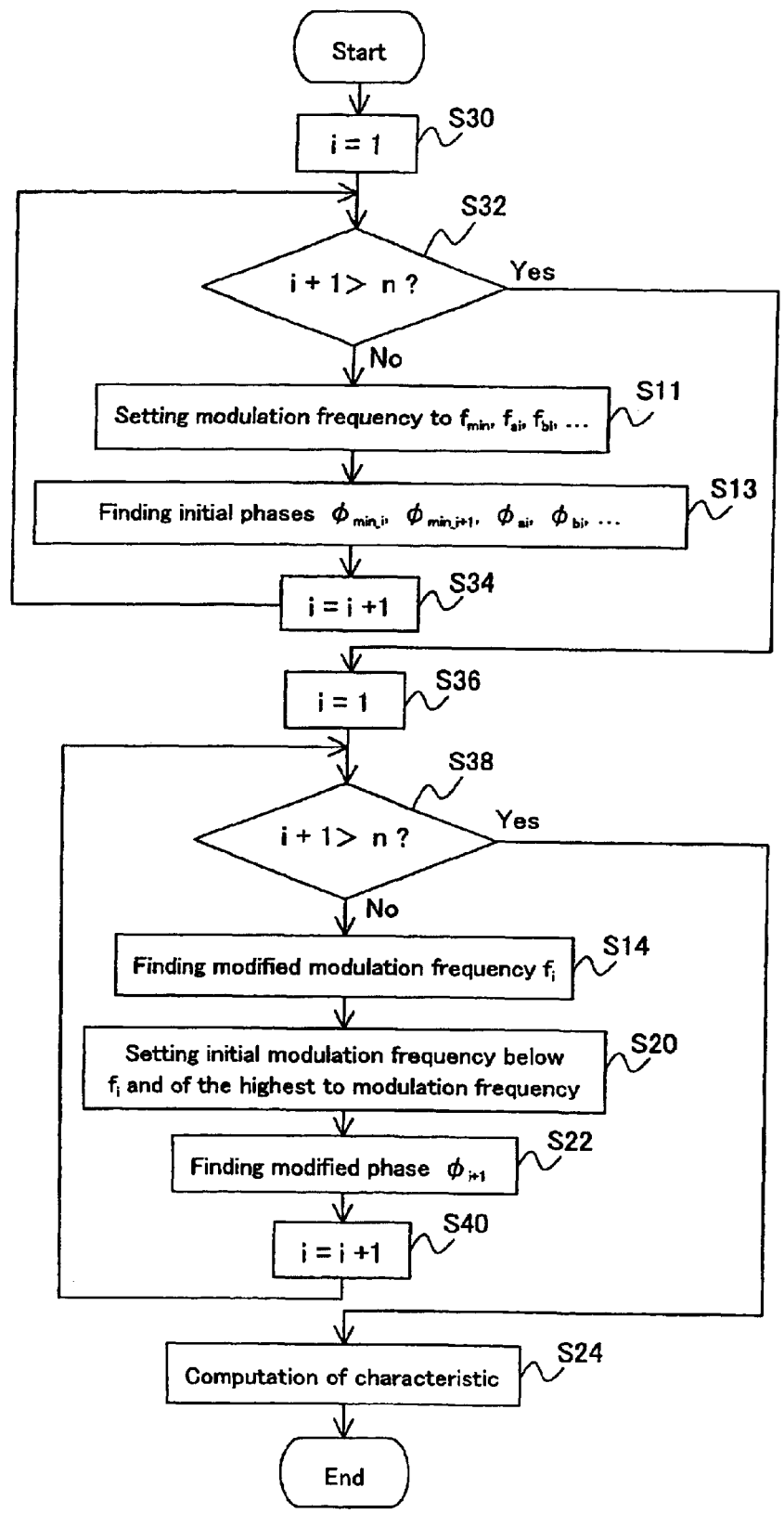
FIG. 10 is a flowchart showing the operation of the fifth preferred embodiment.

And now the operation of the fifth preferred embodiment will be described. FIG. 10 is a flowchart showing the operation of the fifth preferred embodiment. To begin with, the argument i for deciding the type of the wavelength λ is set at 1 (S30). Then, the question of whether the argument i plus 1 has exceeded n is determined (S32). If the argument i plus 1 has not exceeded n (S32, No), the initial modulation frequency setting section 48 sets the initial modulation frequencies fmin, fai, fbi, . . . as the frequencies of the electrical signals for modulation generated by the modulation power source 16 (S11).

And the wavelength setting section 18 sets the wavelength of the variable wavelength light generated by the variable wavelength light source 12 at the first wavelength $\lambda i$ and the second wavelength $\lambda i+1$. The light modulator 14 is supplied with the electrical signals for modulation generated by the modulation power source 16. The variable wavelength light is modulated by the frequencies fmin, fai, fbi, . . . of the electrical signals for modulation at the light modulator 14 and is supplied to the DUT 30. The transmitted light that has transmitted the DUT 30 is converted by the optical/electrical conversion process by the optical/electrical converter 22 and is supplied to the phase comparator 24. The phase comparator 24 measures the phase differences between the phase of the electrical signals outputted by the optical/electrical converter 22 and the phase of the electrical signals for modulation generated by the modulation power source 16. Among these phase differences, the phase differences corresponding to the incident light modulated by the minimum initial modulation frequency fmin are the first initial phase $\phi min\_i$ and the second initial phase $\phi min\_i+1$. Further, the phase differences measured by the phase comparator 24 when the wavelength of the variable wavelength light is the first wavelength $\lambda i$ and the frequencies of the electrical signals for modulation are fai, fbi, . . . are $\phi ai$, $\phi bi$, . . . .

In other words, the phase comparator 24 computes the first initial phase $\phi min\_i$, the second initial phase $\phi min\_i+1$ and the initial phases $\phi ai$, $\phi bi$, . . . (S13). The first initial phase $\phi min\_i$ and the second initial phase $\phi min\_i+1$ are recorded in the initial phase recording section 42. The initial phases $\phi ai$, $\phi bi$, . . . are recorded in the modified phase recording section 28.

Here, the method of computing the first initial phase $\phi min\_i$, the second initial phase $\phi min\ i+1$ and the initial phases $\phi ai$, $\phi bi$, . . . will be described in greater detail with reference to FIG. 6. To begin with, the frequencies of the variable wavelength light are set at the first wavelength $\lambda i$ and the variable frequencies are switched from fmin to fai, fbi, fci, . . . . And the first initial phase $\phi min\_i$ and the initial phases $\phi ai$, $\phi bi$, $\phi ci$, . . . are measured (S13a). Here, S13a means the first step of S13 shown in FIG. 5. Then, the frequency of the variable wavelength light is set at the second wavelength $\lambda i+1$, and the second initial phase $\phi min$ $i+1$ is measured (S13b). Here, S13b means the last step of S13 shown in FIG. 5.

Then, 1 is added to the argument i (S34) and the process returns to the determination of whether the argument i has exceeded n (S32). If the argument i plus 1 has exceeded n (S32, Yes), the wavelength of the variable wavelength light has already changed, and the argument i for deciding the type of wavelength $\lambda$ is again set at 1 (S36). Then, the process returns to the determination of whether the argument i plus 1 has exceeded n (S38). If the argument i plus 1 has not exceeded n (S38, No), the modified modulation frequency computing section 44 reads the first initial phase $\phi min\_i$ and the second modified phase $\phi min\_i+1$ from the initial phase recording section 42 and computes the modified modulation frequency fi (S14). When it is desired to limit the value of $\Delta\phi i$ at a value equal to or below $\pi$, the modified modulation frequency fi can be computed by using the formula shown in FIG. 2(d). When it is desired to contain the $\Delta\phi i$ at a given value other than $\pi$, the modified modulation frequency fi can be computed by multiplying the given value by $fmin/\Delta\phi min$ as shown in FIG. 2(e).

The modified modulation frequency fi is sent from the modified modulation frequency computing section 44 to the modified modulation frequency setting section 46. And equally the initial modulation frequencies fmin, fai, fbi, . . . are sent from the initial modulation frequency setting section 48 to the modified modulation frequency setting section 46. There, the modified modulation frequency setting section 46 sets the maximum frequency at or below the modified modulation frequency fi among the initial modulation frequencies fmin, fai, fbi, . . . as the frequency of the electrical signals for modulation generated by the modulation power source 16 (S20). For example, fai<fbi<fi<fci. In such a case, as shown in FIG. 6, the modified modulation frequency setting section 46 sets fbi as the frequency of the electrical signals for modulation generated by the modulation power source 16.

Then, the wavelength setting section 18 sets the wavelength of the variable wavelength light generated by the variable wavelength light source 12 at the second wavelength $\lambda i+1$. The light modulator 14 is supplied with the electrical signals for modulation generated by the modulation power source 16. The variable wavelength light is modulated by the frequency (any one of fai, fbi, . . . ) set by the modified modulation frequency setting section 46 at the light modulator 14 and is supplied to the DUT 30. The transmitted light that has transmitted the DUT 30 is converted by the optical/electrical conversion process by the optical/electrical converter 22 and is supplied to the phase comparator 24. The phase comparator 24 measures the phase differences between the phase of the electrical signals outputted by the optical/electrical converter 22 and the phase of the electrical signals for modulation generated by the modulation power source 16. This phase difference is the second modified phase $\phi i+1$. In other words, the phase comparator 24 computes the second modified phase $\phi i+1$ (S22). At this point, the second modified phase $\phi i+1$ is recorded at the modified phase recording section 28.

The method whereby the phase comparator 24 computes the second modified phase $\phi i+1$ will be described in greater details with reference to FIG. 6. To begin with; let us suppose that the modified modulation frequency setting section 46 has set fbi as the frequency of the electrical signals for modulation generated by the modulation power source 16. And the phase comparator 24 computes the second modified phase $\phi i+1$ (S22). In this case, since the second wavelength $\lambda i+1$ has been chosen as the wavelength of the variable wavelength light, the phase at the time when the modulation frequency is fbi and the wavelength of the variable wavelength light is $\lambda i+1$ will be measured. In this case, for any frequencies other than f=fbi, the phase at the time when the wavelength of the variable wavelength light is the second wavelength $\lambda i+1$ will not be measured.

Then, 1 is added to the argument i (S40) and the process returns to the determination of whether the argument i has exceeded n (S38). If the argument i plus 1 has exceeded n (S38, Yes), the wavelength of the variable wavelength light has already changed. Now, the first modified phase $\phi i$ corresponds to the modulation frequency set by the modified modulation frequency setting section 46 among the initial phase $\phi ai$, $\phi bi$, . . . set by the modified modulation frequency setting section 46. For example, if the modified modulation frequency setting section 46 sets fbi as the modulation frequency as shown in FIG. 6, the first modified phase $\phi i$ will be the initial phase $\phi bi$. Thus, it can be said that the first modified phase $\phi i$ has already been recorded in the modified phase recording section 28. Then, the characteristic computing section 26 reads the first modified phase $\phi i$ and the second modified phase φi+1 from the modified phase recording section 28, and computes the group delay or the wavelength dispersion of the DUT 30 (S24).

According to the fifth preferred embodiment, it is possible to measure the characteristics of the DUT 30 even if three or more wavelengths of the variable wavelength light are changed.

The Sixth Preferred Embodiment

In comparison with the first and the second preferred embodiments wherein the wavelength setting section 18 sets two wavelengths of the variable wavelength light, the sixth preferred embodiment is different in that it has three or more wavelengths of the variable wavelength light set by the wavelength setting section 18.

Also in comparison with the fifth preferred embodiment wherein the modified modulation frequency is computed after all the first wavelength λi and the second wavelength λi+1 have been set, in other words after all the initial phases have been measured, the sixth preferred embodiment is different in that the modified modulation frequency is computed after each setting of the first wavelength λi and the second wavelength λi+1.

The configuration of the sixth preferred embodiment is similar to that of the second embodiment and its description is omitted.

Figure 11:
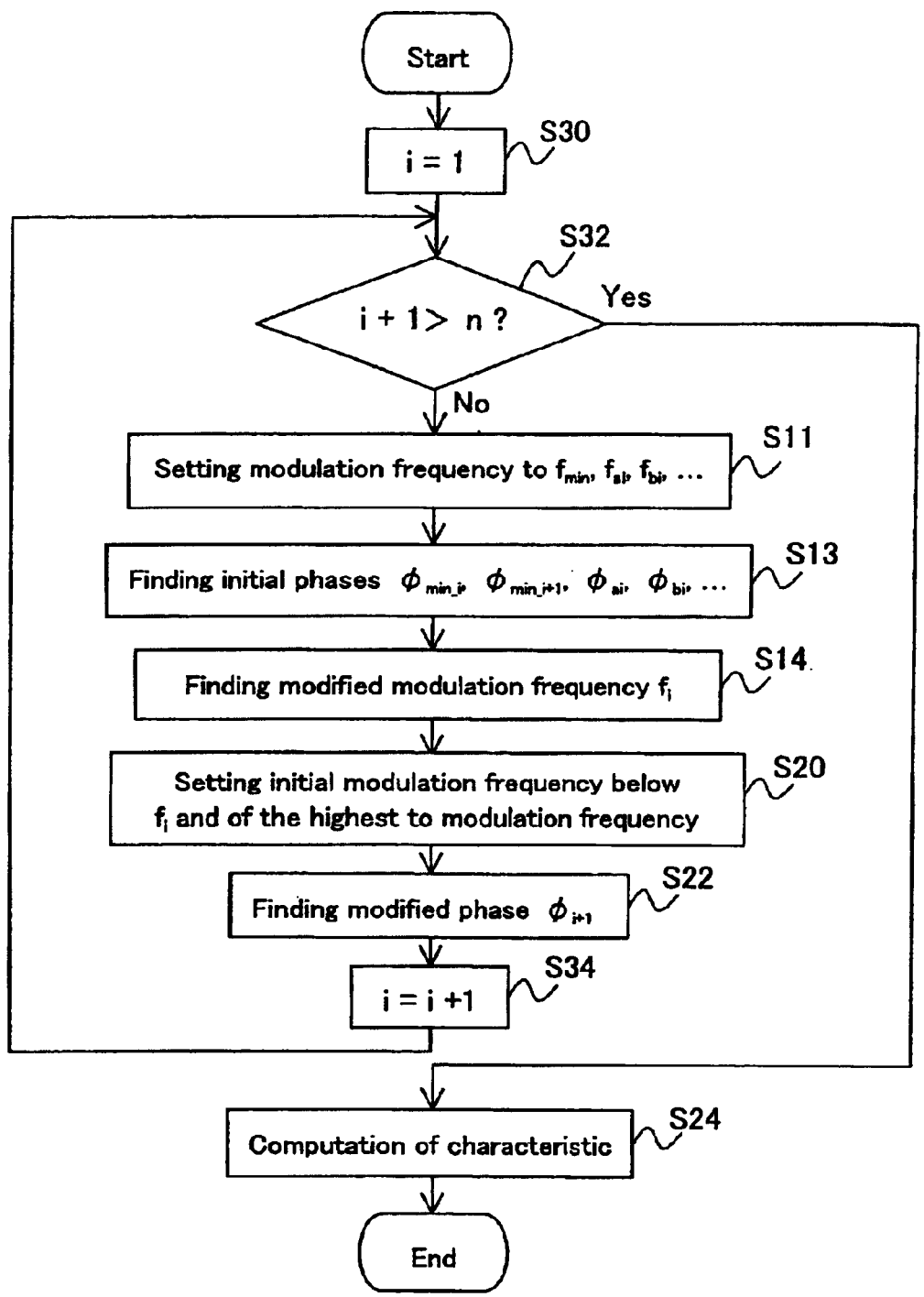
FIG. 11 is a flowchart showing the operation of the sixth preferred embodiment.
Figure 12:
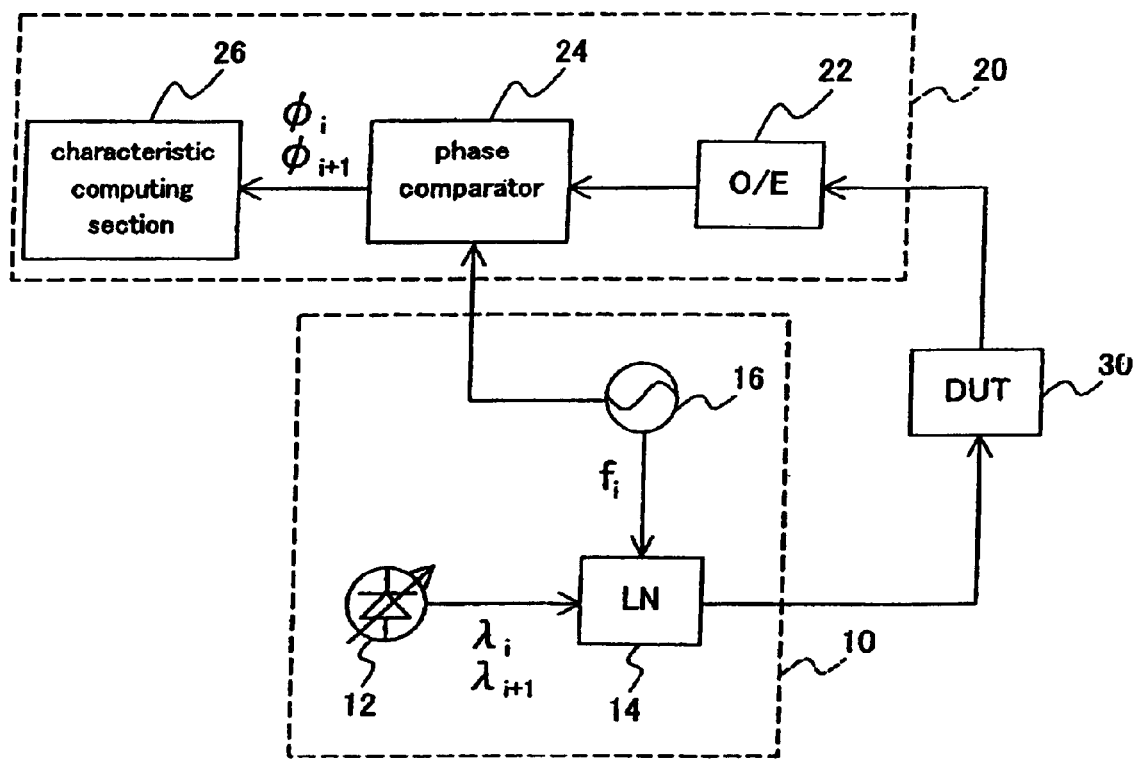
FIG. 12 is a block diagram showing the configuration of an optical characteristic measuring apparatus according to the prior art.
Figure 13:
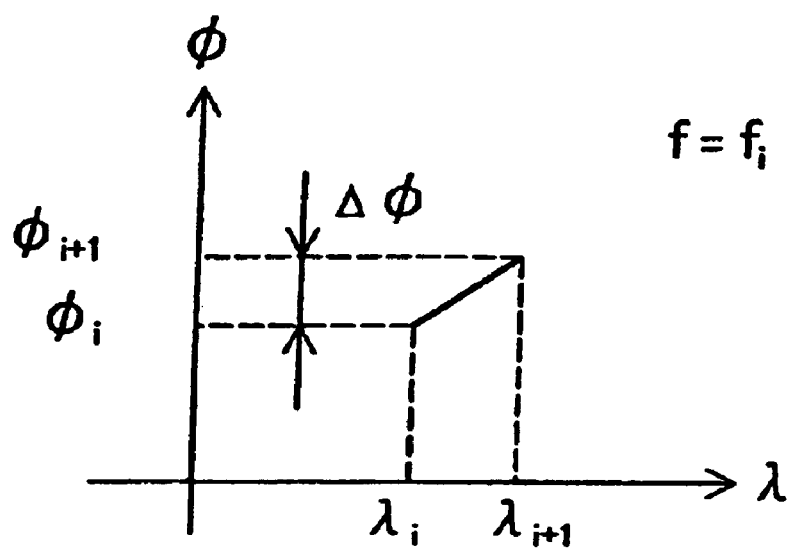
FIG. 13 is a phase-wavelength diagram according to the prior art.

And now the operation of the sixth preferred embodiment will be described. FIG. 11 is a flowchart showing the operation of the sixth preferred embodiment. To begin with, the argument i for deciding the type of the wavelength λ is set at 1 (S30). Then, the question of whether the argument i plus 1 has exceeded n is determined (S32). If the argument i plus 1 has not exceeded n (S32, No), the initial modulation frequency setting section 48 sets the initial modulation frequencies fmin, fai, fbi, . . . as the frequencies of the electrical signals for modulation generated by the modulation power source 16 (S11).

And the wavelength setting section 18 sets the wavelength of the variable wavelength light generated by the variable wavelength light source 12 at the first wavelength λi and the second wavelength λi+1. The light modulator 14 is supplied with the electrical signals for modulation generated by the modulation power source 16. The variable wavelength light is modulated by the frequencies fmin, fai, fbi, . . . of the electrical signals for modulation at the light modulator 14 and is supplied to the DUT 30. The transmitted light that has transmitted the DUT 30 is converted by the optical/electrical conversion process by the optical/electrical converter 22 to be supplied to the phase comparator 24. The phase comparator 24 measures the phase differences between the phase of the electrical signals outputted by the optical/electrical converter 22 and the phase of the electrical signals for modulation generated by the modulation power source 16. Among these phase differences, the phase differences corresponding to the incident light modulated by the minimum initial modulation frequency fmin are the first initial phase φmin_i and the second initial phase φmin_i+1. Further, the phase differences measured by the phase comparator 24 when the wavelength of the variable wavelength light is the first wavelength λi and the frequencies of the electrical signals for modulation are fai, fbi, . . . are φai, φbi, . . . .

In other words, the phase comparator 24 computes the first initial phase φmin_i, the second initial phase φmin_i+1 and the initial phases φai, φbi, . . . (S13). The first initial phase φmin_i and the second initial phase φmin_i+1 are recorded in the initial phase recording section 42. The initial phases φai, φbi, . . . are recorded in the modified phase recording section 28.

Here, the method of computing the first initial phase φmin_i, the second initial phase φmin_i+1 and the initial phases φai, φbi, . . . will be described in greater detail with reference to FIG. 6. To begin with, the frequencies of the variable wavelength light are set at the first wavelength λi and the modulation frequencies are switched from fmin to fai, fbi, fci, . . . And the first initial phase φmin_i and the initial phases φai, φbi, φci, . . . are measured (S13a). Here, S13a means the first step of S13 shown in FIG. 5. Then, the wavelength of the variable wavelength light is set at the second wavelength of λi+1, and the second initial phase φmin_i+1 is measured (S13b). Here, S13b means the last step of S13 shown in FIG. 5.

The modified modulation frequency computing section 44 reads the first initial phase φmin_i and the second initial phase φmin_i+1 from the initial phase recording section 42 and computes the modified modulation frequency fi (S14). When it is desired to limit the value of Δφi at a value equal to or below π, the modified modulation frequency fi can be computed by means of the formula shown in FIG. 2(d). If it is desired to keep Δφi at a value other than π, it is possible to compute the modified modulation frequency fi by multiplying the given value by fmin/Δφmin as shown in FIG. 2(e).

The modified modulation frequency fi is sent from the modified modulation frequency computing section 44 to the modified modulation frequency setting section 46. And equally the initial modulation frequencies fmin, fai, fbi, . . . are sent from the initial modulation frequency setting section 48 to the modified modulation frequency setting section 46. Therefore, the modified modulation frequency setting section 46 sets the maximum frequency at or below the modified modulation frequency fi among the initial modulation frequencies fmin, fai, fbi, . . . as the frequency of the electrical signals for modulation generated by the modulation power source 16 (S20). For example, fai<fbi<fi<fci. In such a case, as shown in FIG. 6, the modified modulation frequency setting section 46 sets fbi as the frequency of the electrical signals for modulation generated by the modulation power source 16.

Then, the wavelength setting section 18 sets the wavelength of the variable wavelength light generated by the variable wavelength light source 12 at the second wavelength λi+1. The light modulator 14 is supplied with the electrical signals for modulation generated by the modulation power source 16. The variable wavelength light is modulated by the frequency (any one of fai, fbi, . . . ) of the electrical signals for modulation at the light modulator 14 and is supplied to the DUT 30. The transmitted light that has transmitted the DUT 30 is converted by the optical/electrical conversion process by the optical/electrical converter 22 to be supplied to the phase comparator 24. The phase comparator 24 measures the phase differences between the phase of the electrical signals outputted by the optical/electrical converter 22 and the phase of the electrical signals for modulation generated by the modulation power source 16. This phase difference is the second modified phase φi+1. In other words, the phase comparator 24 computes the second modified phase φi+1 (S22). At this point, the second modified phase φi+1 is recorded at the modified phase recording section 28.

The method whereby the phase comparator 24 computes the second modified phase φi+1 will be described in greater details with reference to FIG. 6. To begin with, let us suppose that the modified modulation frequency setting section 46 has set fbi as the frequency of the electrical signals for modulation generated by the modulation power source 16. And the phase comparator 24 computes the second modified phase φi+1 (S22). In this case, since the second wavelength λi+1 has been chosen as the wavelength of the variable wavelength light, the phase at the time when the modulation frequency is fbi and the wavelength of the variable wavelength light is λi+1 will be measured. In this case, for any frequencies other than f=fbi, the phase at the time when the wavelength of the variable wavelength light is the second wavelength λi+1 will not be measured.

Then, 1 is added to the argument i (S34) and the process returns to the determination of whether the argument i has exceeded n (S32). If the argument i plus 1 has exceeded n (S32, Yes), the wavelength of the variable wavelength light has already changed. Now, the first modified phase φi corresponds to the modulation frequency among the initial phase φai, φbi, . . . set by the modified modulation frequency setting section 46. For example, if the modified modulation frequency setting section 46 sets fbi as the modulation frequency as shown in FIG. 6, the first modified phase φi will be the initial phase φbi. Thus, it can be said that the first modified phase φi has already been recorded in the modified phase recording section 28. Then, the characteristic computing section 26 reads the first modified phase φi and the second modified phase φi+1, and computes the group delay or the wavelength dispersion of the DUT 30 (S24).

According to the sixth preferred embodiment, it is possible to measure the characteristics of the DUT 30 even if three or more wavelengths of the variable wavelength light are changed.

In the meanwhile, the embodiment described above can be realized by having a media reading apparatus of a computer provided with a CPU, a hard disk, memory media (a floppy disk, a CD-ROM, etc.) read a program executing various functions described above and installing the program on a hard disk. In this way, the functions described above can be performed.

According to the present invention, the range of frequencies for modulating the incident light can be enlarged and therefore the precision of measuring can be enhanced.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. An apparatus for measuring the characteristics of device under test that transmits light comprising:
    a variable wavelength light source for generating a variable wavelength light;
    a wavelength setting means for setting said variable wavelength light at a first wavelength and a second wavelength;
    an initial modulation frequency setting means for setting the initial modulation frequency for modulation;
    a modulating signal generating means for generating a modulating signal of a set modulation frequency;
    an optical modulating means for receiving the input of said modulating signal and modulating said variable wavelength light with the frequency of said modulating signal;
    a phase measuring means for measuring a first phase of a transmitted light, which is obtained by the transmission through the device under test of an incident light having the first wavelength and a second phase of said transmitted light, which is obtained by he transmission through the device under test of an incident light having the second wavelength;
    a modified modulation frequency computing means for computing a modified modulation frequency by multiplying a value, which is obtained by dividing a give phase value by the phase difference between the first phase and the second phase, by said initial modulation frequency; and
    a modified modulation frequency setting means for setting said modified modulation frequency as the frequency of said modulating signal,
    wherein the characteristics of device under test are measured on the basis of the transmitted light resulting from the transmission through said device under test of the incident light modulated by a frequency set by said modified modulation frequency setting means.

2. The optical characteristic measuring apparatus according to claim 1, wherein said initial modulation frequency setting means sets a minimum initial modulation frequency and said initial modulation frequencies other than said minimum initial modulation frequency;
    said modified modulation frequency computing means computes a modified modulation frequency by multiplying by said minimum initial modulation frequency a value obtained by dividing said given phase value by the phase difference between said first phase and said second phase of said transmitted light resulting from the transmission through said device under test of said incident light modulated by said minimum initial modulation frequency; and
    said modified modulation frequency setting means sets a maximum said initial modulation frequency among said initial modulation frequencies equal to or below said modified modulation frequencies as the frequency of said modulating signal.

3. The optical characteristic measuring apparatus according to claim 1, wherein there are a plurality of first wavelengths and a plurality of second wavelengths.

4. The optical characteristic measuring apparatus according to claim 3 wherein, the intervals between said first wavelength and said second wavelength are equal, and
    said second wavelength is taken as said first wavelength and furthermore another second wavelength is taken so that the intervals between said first wavelength and said second wavelength are equal.

5. The optical characteristics measuring apparatus according to claim 1, wherein after completing the setting of said first wavelength and said second wavelength, said modified modulation frequency setting means sets said modified modulation frequency as the frequency of said modulating signal.

6. The optical characteristics measuring apparatus according to claim 1, wherein every time when said first wavelength and said second wavelength are set, said modified modulation frequency setting means sets said modified modulation frequency as the frequency of said modulating signal.

7. The optical characteristics measuring apparatus according to claim 1, comprising an optical/electrical conversion means for outputting electrical signals obtained by optical/electrical conversion of said transmitted light to said phase measuring means.

8. The optical characteristics measuring apparatus according to claim 1, wherein said phase measuring means measures the phase difference between said modulating signal and said transmitted light.

9. The optical characteristics measuring apparatus according to claim 1, comprising a characteristic computing means for computing the group delay or the wavelength dispersion of said device under test by means of said phase difference measured by said phase measuring means.

10. A method for measuring the characteristics of device under test that transmits light comprising:

a variable wavelength light generating step for generating a variable wavelength light;

a wavelength setting step for setting said variable wavelength light at a first wavelength and a second wavelength;

an initial modulation frequency setting step for setting the initial modulation frequency for modulation;

a modulating signal generating step for generating a modulating signal of a set modulation frequency;

an optical modulating step for receiving the input of said modulating signal and modulating said variable wavelength light with the frequency of said modulating signal;

a phase measuring step for measuring the first phase of said transmitted light, which is obtained by the transmission through the device under test of an incident light having the first wavelength and the second phase of said transmitted light, which is obtained by the transmission through the device under test of an incident light having the second wavelength;

a modified modulation frequency computing step for computing a modified modulation frequency by multiplying a value, which is obtained by dividing a given phase value by the phase difference between the first phase and the second phase, by said initial modulation frequency; and a modified modulation frequency setting step for setting said modified modulation frequency as the frequency of said modulating signal, wherein the characteristics of device under test are measured on the basis of the transmitted light resulting from the transmission through said device under test of the incident light modulated by a frequency set by said modified modulation frequency setting step.

11. The optical characteristic measuring method according to claim 10, wherein said initial modulation frequency setting step sets a minimum initial modulation frequency and said initial modulation frequencies other than said minimum initial modulation frequency;

said modified modulation frequency computing step computes a modulation modified frequency by multiplying by said minimum initial modulation frequency a value obtained by dividing said given phase value by the phase difference between said first phase and said second phase of said transmitted light resulting from the transmission through said device under test of said incident light modulated by said minimum initial modulation frequency; and said modified modulation frequency setting step sets a maximum said initial modulation frequency among said initial modulation frequencies equal to or below said modified modulation frequencies as the frequency of said modulating signal.

12. A computer-readable medium having a program of instructions for execution by the computer to perform a characteristics measuring process for measuring characteristics of device under test that transmits light, said characteristics measuring process comprising:

a variable wavelength light generating process for generating a variable wavelength light;

a wavelength setting process for setting said variable wavelength light at a first wavelength and a second wavelength;

an initial modulation frequency setting process for setting the initial modulation frequency for modulation;

a modulating signal generating process for generating a modulating signal of a set modulation frequency;

an optical modulating process for receiving the input of said modulating signal and modulating said variable wavelength light with the frequency of said modulating signal;

a phase measuring process for measuring the first phase of said transmitted light, which is obtained by the transmission through the device under test of an incident light having the first wavelength and the second phase of said transmitted light, which is obtained by the transmission through the device under test of an incident light having the second wavelength;

a modified modulation frequency computing process for computing a modified modulation frequency by multiplying a value, which is obtained by dividing a given phase value by the phase difference between the first phase and the second phase, by said initial modulation frequency; and a modified modulation frequency setting process for setting said modified modulation frequency as the frequency of said modulating signal, wherein the characteristics of device under test are measured on the basis of the transmitted light resulting from the transmission through said device under test of the incident light modulated by a frequency set by said modified modulation frequency setting process.

13. The computer-readable medium according to claim 12, wherein said initial modulation frequency setting process sets a minimum initial modulation frequency and said initial modulation frequencies other than said minimum initial modulation frequency;

said modified modulation frequency computing process computes a modified modulation frequency by multiplying by said minimum initial modulation frequency a value obtained by dividing said given phase value by the phase difference between said first phase and said second phase of said transmitted light resulting from the transmission through said device under test of said incident light modulated by said minimum initial modulation frequency; and said modified modulation frequency setting process sets a maximum said initial modulation frequency among said initial modulation frequencies equal to or below said modified modulation frequencies as the frequency of said modulating signal.

* * * * *